(12) United States Patent
Shimada

(10) Patent No.: US 7,839,853 B2
(45) Date of Patent: Nov. 23, 2010

(54) TRANSMITTING APPARATUS AND FRAME TRANSFER METHOD

(75) Inventor: Katsumi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 886 days.

(21) Appl. No.: 11/339,805

(22) Filed: Jan. 25, 2006

(65) Prior Publication Data
US 2007/0071019 A1 Mar. 29, 2007

(30) Foreign Application Priority Data
Sep. 26, 2005 (JP) .............................. 2005-278573

(51) Int. Cl.
*H04L 12/56* (2006.01)
(52) U.S. Cl. .................................................. 370/392
(58) Field of Classification Search ........................ None
See application file for complete search history.

(56) References Cited

U.S. PATENT DOCUMENTS

| | | | | |
|---|---|---|---|---|
| 5,220,562 A * | 6/1993 | Takada et al. | ............... | 370/404 |
| 5,329,527 A | 7/1994 | Ujihashi et al. | | |
| 5,774,662 A | 6/1998 | Sakagawa | | |
| 5,872,783 A * | 2/1999 | Chin | ............... | 370/395.32 |
| 6,311,222 B1 * | 10/2001 | Crump et al. | ............... | 709/246 |
| 6,324,185 B1 * | 11/2001 | Budhraja | ............... | 370/468 |
| 6,529,507 B1 * | 3/2003 | O'Malley et al. | ........... | 370/392 |
| 6,765,914 B1 * | 7/2004 | Jain et al. | .................... | 370/390 |
| 6,771,662 B1 * | 8/2004 | Miki et al. | ................... | 370/469 |
| 6,775,706 B1 * | 8/2004 | Fukumoto et al. | ........... | 370/389 |
| 6,807,172 B1 * | 10/2004 | Levenson et al. | ........... | 370/389 |
| 7,095,760 B1 * | 8/2006 | Parruck et al. | ............... | 370/539 |
| 7,277,948 B2 * | 10/2007 | Igarashi et al. | ............... | 370/331 |
| 7,414,995 B1 * | 8/2008 | Melkote et al. | ............. | 370/400 |
| 2001/0053694 A1 * | 12/2001 | Igarashi et al. | ............... | 455/433 |
| 2002/0105965 A1 * | 8/2002 | Dravida et al. | ............... | 370/469 |
| 2002/0176363 A1 * | 11/2002 | Durinovic-Johri et al. | .. | 370/237 |
| 2002/0176427 A1 * | 11/2002 | Noda et al. | ................... | 370/401 |
| 2003/0002482 A1 * | 1/2003 | Kubler et al. | ................ | 370/352 |
| 2003/0026260 A1 * | 2/2003 | Ogasawara et al. | ......... | 370/392 |
| 2003/0058854 A1 * | 3/2003 | Cote | .......................... | 370/392 |
| 2003/0118026 A1 * | 6/2003 | Kuhl et al. | ............. | 370/395.21 |
| 2003/0137936 A1 * | 7/2003 | Cornet et al. | ................ | 370/230 |

(Continued)

FOREIGN PATENT DOCUMENTS

JP 4-107029 4/1992

(Continued)

OTHER PUBLICATIONS

Japanese Office Action dated May 11, 2010, from the corresponding Japanese Application.

*Primary Examiner*—Gregory B Sefcheck
*Assistant Examiner*—Joshua Smith
(74) *Attorney, Agent, or Firm*—Katten Muchin Roseman LLP

(57) ABSTRACT

A transmitting apparatus includes a network interface for connecting between networks; an information embedding unit that embeds, in a frame output from the network interface, first port information for identifying a first port through which the frame is received; and a path deciding unit that decides, when second port information for designating a second port that is an output destination of the frame is embedded in the frame received through the network interface, to output the frame to the second port.

4 Claims, 38 Drawing Sheets

NOTE: ETHERNET IS A REGISTERED TRADEMARK

U.S. PATENT DOCUMENTS

| | | | |
|---|---|---|---|
| 2003/0189932 A1* | 10/2003 | Ishikawa et al. | 370/392 |
| 2004/0024911 A1* | 2/2004 | Chung et al. | 709/249 |
| 2004/0085962 A1* | 5/2004 | Sugai et al. | 370/392 |
| 2004/0114583 A1* | 6/2004 | Cetin et al. | 370/360 |
| 2004/0136368 A1* | 7/2004 | Wakayama et al. | 370/389 |
| 2005/0053073 A1* | 3/2005 | Kloth et al. | 370/395.41 |
| 2005/0105560 A1* | 5/2005 | Mann et al. | 370/503 |
| 2005/0201387 A1* | 9/2005 | Willis | 370/395.52 |
| 2006/0072574 A1* | 4/2006 | Akahane et al. | 370/392 |
| 2006/0291447 A1* | 12/2006 | Siliquini et al. | 370/352 |
| 2007/0223398 A1* | 9/2007 | Luo et al. | 370/254 |

FOREIGN PATENT DOCUMENTS

| | | |
|---|---|---|
| JP | 8-18571 | 1/1996 |
| JP | 2003-143174 | 5/2003 |

* cited by examiner

| MAC ADDRESS | UNIT NUMBER | PORT NUMBER |
|---|---|---|
| . . . | . . . | . . . |

| MAC ADDRESS | UNIT NUMBER | PORT NUMBER |
|---|---|---|
| ⋮ | ⋮ | ⋮ |
| 000000000011 | #1 | #P1 |
| ⋮ | ⋮ | ⋮ |

FIG.13

| MAC ADDRESS | UNIT NUMBER | PORT NUMBER |
|---|---|---|
| . . . | . . . | . . . |
| 000000000011 | #1 | #P1 |
| . . . | . . . | . . . |
| 000000000016 | #3 | #P2 |
| . . . | . . . | . . . |

NOTE: ETHERNET IS A REGISTERED TRADEMARK

| MAC ADDRESS | UNIT NUMBER | PORT NUMBER | PVC NUMBER |
|---|---|---|---|
| . . . | . . . | . . . | . . . |

FIG.26

| MAC ADDRESS | UNIT NUMBER | PORT NUMBER |
|---|---|---|
| . . . | . . . | . . . |
| 000000000021 | #1 | #P1 |
| . . . | . . . | . . . |

FIG.27

| SLOT NUMBER | IMPLEMENTED / UNIMPLEMENTED | UNIT TYPE |
|---|---|---|
| 1 | 1 | 2 |
| 2 | 1 | 1 |
| 3 | 1 | 1 |
| 4 | 0 | 1 |

IMPLEMENTED / UNIMPLEMENTED:
1: IMPLEMENTED,
2: UNIMPLEMENTED
UNIT TYPE:
1: ETHERNET, 2: ATM

NOTE: ETHERNET IS A REGISTERED TRADEMARK

| MAC ADDRESS | UNIT NUMBER | PORT NUMBER | PVC NUMBER |
|---|---|---|---|
| ⋮ | ⋮ | ⋮ | ⋮ |
| 000000000021 | #1 | #P1 | 30 |
| ⋮ | ⋮ | ⋮ | ⋮ |

NOTE: ETHERNET IS A REGISTERED TRADEMARK

NOTE: ETHERNET IS A REGISTERED TRADEMARK

FIG.40

| MAC ADDRESS | UNIT NUMBER | PORT NUMBER | PVC NUMBER | SOURCE EQUIPMENT PORT INFORMATION |
|---|---|---|---|---|
| ⋮ | ⋮ | ⋮ | ⋮ | ⋮ |

FIG.44

| MAC ADDRESS | UNIT NUMBER | PORT NUMBER | PVC NUMBER | SOURCE EQUIPMENT PORT INFORMATION |
|---|---|---|---|---|
| . . . | . . . | . . . | . . . | . . . |
| 000000000021 | #1 | #P1 | 30 | #1, #P1 |
| . . . | . . . | . . . | . . . | . . . |

TRANSMITTING APPARATUS AND FRAME TRANSFER METHOD

BACKGROUND OF THE INVENTION

1. Field of the Invention

The present invention relates to transmitting apparatus with an interface for network-to-network communications, and a frame transfer method utilizing such transmitting apparatus, and more particularly to transmitting apparatus and frame transfer method capable of simplifying learning functions without degrading the frame transfer performance.

2. Description of the Related Art

A layer 2 switch (hereinafter, "L2 switch") has a function of learning path information and independently deciding a transfer destination of a Media Access Control (MAC) frame. More specifically, the L2 switch learns in advance the relationship between the source MAC address of the MAC frame and the position of the receiving port, so as to transmit, if the destination MAC address in the MAC frame proves to be a learned one upon receipt of the frame, the MAC frame only to the designated port based on the learned information.

The function of learning the path thus eliminates the need to reproduce the MAC frame for all the ports, thereby preventing generation of useless traffic. Such path learning is also performed in an Asynchronous Transfer Mode (ATM) network or the like where a plurality of networks is connected, as disclosed, for example, in Japanese Patent Application Laid-Open No. H8-18571.

The recent progress in communications speed of networks requires quicker operations in deciding the paths from transmitting apparatus such as the L2 switch, and hence the learned information of the paths is often stored in a Content Addressable Memory (CAM) which allows quick memory retrieval.

However, employing the CAM results in a higher cost of the transmitting apparatus because the CAM is an expensive memory. Especially in chassis-type transmitting apparatus that includes a plurality of communications units, many CAMs have to be employed because the path information has to be stored in each communications unit, and therefore, the cost increases accordingly.

SUMMARY OF THE INVENTION

It is an object of the present invention to at least solve the problems in the conventional technology.

A transmitting apparatus according to one aspect of the present invention includes a network interface for connecting between networks; an information embedding unit that embeds, in a frame output from the network interface, first port information for identifying a first port through which the frame is received; and a path deciding unit that decides, when second port information for designating a second port that is an output destination of the frame is embedded in the frame received through the network interface, to output the frame to the second port.

A frame transmitting method for a transmitting apparatus that includes a network interface for connecting between networks, according to another aspect of the present invention, includes embedding, in a frame output from the network interface, first port information for identifying a first port through which the frame is received; and deciding, when second port information for designating a second port that is an output destination of the frame is embedded in the frame received through the network interface, to output the frame to the second port.

A frame transmitting method for a transmitting apparatus that includes a network interface for connecting between networks, according to still another aspect of the present invention, includes associating a source address of a frame output from the network interface and a port through which the frame is received, as learned information; storing the learned information in a storage unit; and path deciding including, when port information for designating an output destination of the frame is not embedded in the frame received through the network interface, searching the learned information using an address of the output destination of the frame as a key, outputting, when the output destination of frame is included in the learned information, the frame to a corresponding port, and outputting, when the output destination of the frame is not included in the learned information, the frame to all paths other than the network interface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is another example of the reference table after learning;

FIG. 26 is still another example of the reference table after learning;

FIG. 27 is a table of information of implemented units;

FIG. 40 is an example of a reference table;

FIG. 44 is an example of a reference table in a line-unit after learning;

DETAILED DESCRIPTION OF THE PREFERRED EMBODIMENTS

Exemplary embodiments of the present invention will be described in detail below with reference to the accompanying drawings. In the exemplary embodiment, a frame transfer method according to the present invention is applied to a chassis-type L2 switch, and hence the conventional chassis-type L2 switch will be first described.

It should be noted that the application of the frame transfer method according to the present invention is not limited to the chassis-type 2 switch.

[Conventional Chassis-Type L2 Switch]

Figure 1:
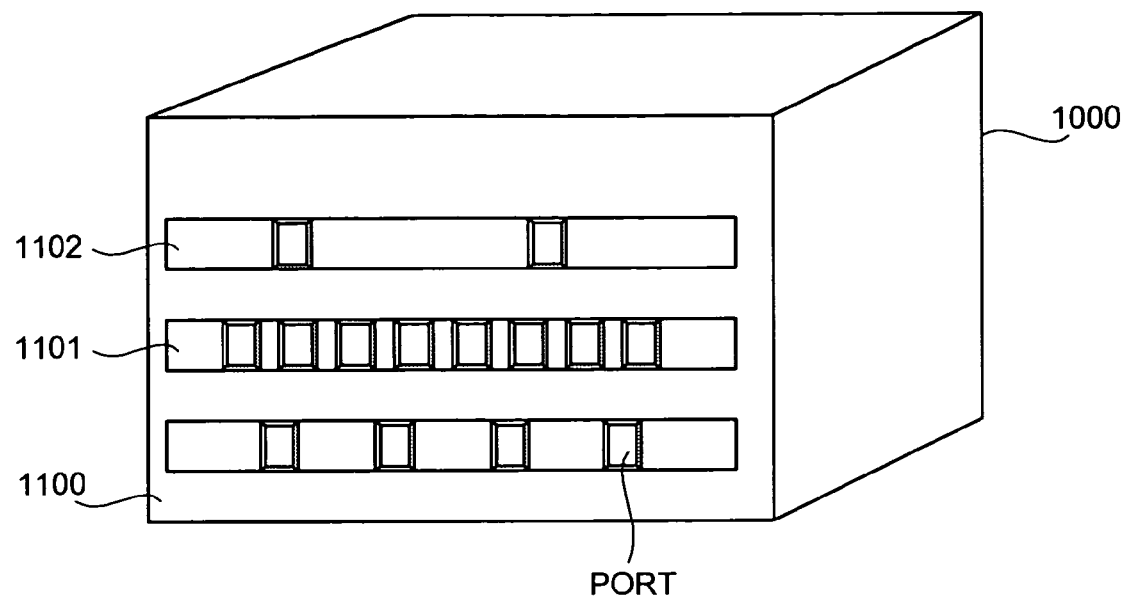
FIG. 1 is a perspective view of a chassis-type L2 switch.

A chassis-type L2 switch includes a plurality of removable line units connected through a backplane. FIG. 1 is a perspective view of an L2 switch 1000 according to a conventional technology. The L2 switch 1000 includes three line units, including a line unit 1100, a line unit 1101, and a line unit 1102, respectively connected to a backplane.

The line unit is a printed circuit board carrying a plurality of interface ports (for example, an Ethernet®) port of 100 Mbps) and a frame transfer function, and is connected to the backplane via a connector.

Such a chassis-type configuration allows changing the combination of the line units according to the purpose of the equipment, thus increasing the versatility of the equipment. One and the same chassis can constitute various configurations of the L2 switch by changing the line unit combination, for example, uniformly providing the 100-Mbps Ethernet® unit to all the line units, or employing a different unit such as a 1 Gbps Ethernet® unit or an ATM unit in some of the line units.

Also, even when a part of the ports or the line units becomes defective, just replacing the defective line unit solves the problem without the need to replace the entire equipment, which leads to greater utility of the equipment.

Figure 2:
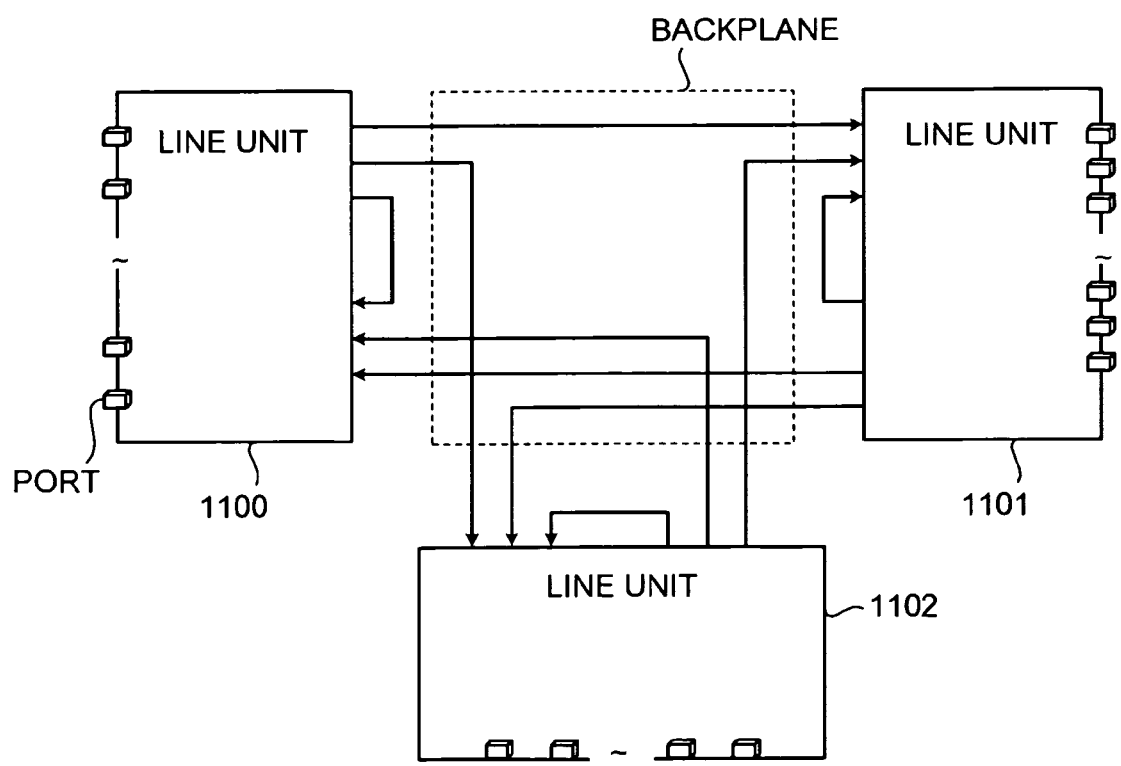
FIG. 2 is a block diagram of a connection status of a line unit.

Connection modes of the line units of the chassis-type L2 switch include a mesh-type connection of the line units via a wiring on the backplane. For example, when connecting the three line units in the chassis-type L2 switch, each line unit is provided with three output paths and three input paths through the backplane, as shown in FIG. 2.

When the line units are thus connected directly to one another via the backplane, the input-side line unit has to decide the transfer destination of the frame. This is because, if the input-side line unit transfers the frame to other line units connected via the backplane without deciding the transfer destination of the frame, the respective line units have to decide the frame transfer destination, which is otherwise unnecessary, thus incurring an increase in load.

Accordingly, the foregoing learning function of the MAC address has to be incorporated in all the input-side line units. In the chassis-type L2 switch in general, every line unit serves as both an outputting and a receiving side, and hence all the line units have to be loading the learning function of the MAC address.

Consequently, the chassis-type L2 switch has to include the expensive CAM in all the line units in order to perform a high-speed retrieval, which inevitably leads to an increase in the cost of the equipment.

Figure 3:
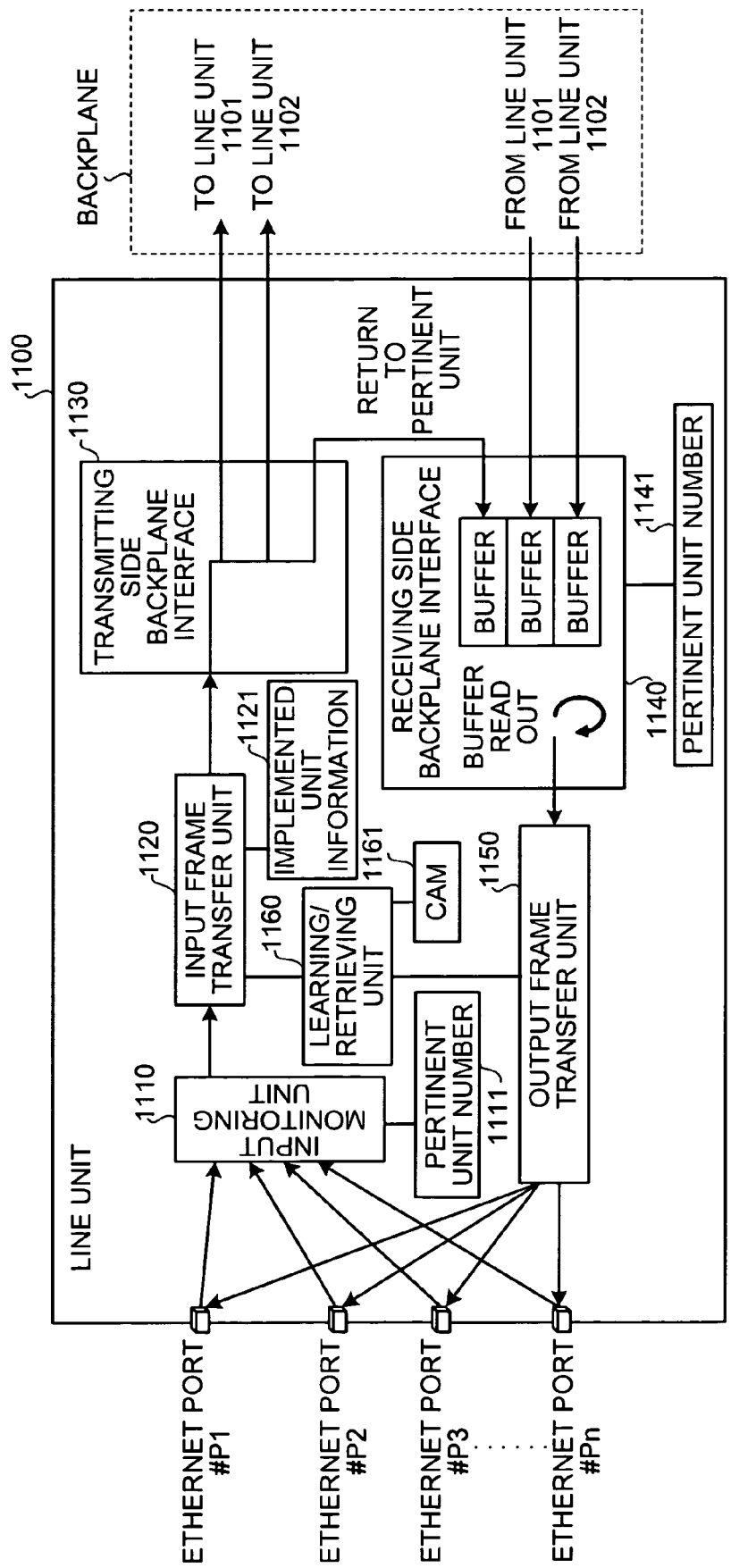
FIG. 3 is a block diagram of a configuration of a line unit that includes an Ethernet® interface.

FIG. 3 is a block diagram of a configuration of the line unit that includes the Ethernet® interface. While FIG. 3 represents a configuration of the line unit 1100, the line units 1101 and 1102 also have a similar configuration.

The line unit 1100 includes at least one Ethernet® port, an input monitoring unit 1110, an input frame transfer unit 1120, a transmitting side backplane interface 1130, a receiving side backplane interface 1140, an output frame transfer unit 1150, and a learning/retrieving unit 1160.

Each Ethernet® port has a port number for distinction from other ports. Likewise, each line unit has a unique unit number for distinction from other line units. In the following description, an n-th port will be denoted by #Pn, and an n-th unit by #n.

The input monitoring unit 1110 is a processing unit that monitors whether the respective Ethernet® ports receive a MAC frame and, once any Ethernet® port has received a normal MAC frame, adds an internal frame header to the MAC frame and transfers such MAC frame to the input frame transfer unit 1120.

Figures 4, 5:
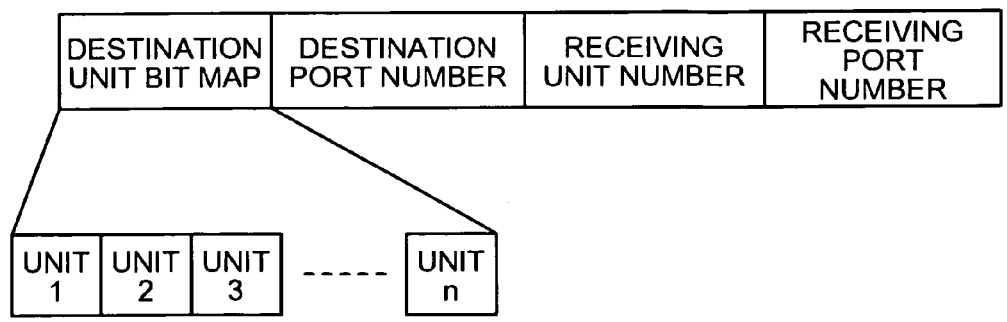
FIG. 4 is a diagram of a MAC frame format received by the Ethernet® port.
FIG. 5 is a diagram of an internal frame header format.

FIG. 4 is a diagram of a MAC frame format received by the Ethernet® port. The MAC frame includes a MAC address indicating the destination address (DA), another MAC address indicating the source address (SA), a Type/Length, a payload to store the object data, and a Frame Check Sequence (FCS) for detecting an error. The Type/Length field is utilized as Type when indicating an upper layer protocol, and as Length when indicating the length of the frame.

FIG. 5 is a diagram of an internal frame header format. As shown therein, the internal frame header includes a destination unit bit map, a destination port number, a receiving unit number, and a receiving port number.

The destination unit bit map expresses the destination line unit by bit, and allocates 1 to the destination unit. For example, each bit is allocated to the respective line units on a one-to-one basis. In this case, the destination unit bit map includes a greater number of bits than the number of line units that can be implemented in the L2 switch 1000. The destination port number indicates to which port in the line unit the frame is to be output. The receiving unit number and the receiving port number represent the numbers of the unit and the port that has received the frame, respectively.

The input monitoring unit 1110 allocates the number of the pertinent unit 1111 to the receiving unit number in the internal frame header added to the frame, and the number of the port that has received the MAC frame to the receiving port number, and leaves the destination unit bit map and the destination port number in the initial state.

The input frame transfer unit 1120 is a processing unit that decides the transfer destination of the MAC frame, provides the decision into the internal frame header, and then transfers the MAC frame to the transmitting side backplane interface 1130.

The input frame transfer unit 1120 acquires the destination MAC address of the MAC frame, and decides whether the address designates a multicast or broadcast. According to the prescription of the Ethernet®, a MAC address having 1 at the lowest bit of the first byte indicates the multicast or broadcast.

When the MAC address proves to be indicating the multicast or broadcast, the input frame transfer unit 1120 sets the destination unit bit map so that the MAC frame is transferred to all the line units implemented in the L2 switch 1000. The input frame transfer unit 1120 looks up implemented unit information 1121, and sets the destination unit bit map such that 1 is allocated to all the bits corresponding to the line units implemented in the L2 switch 1000.

The implemented unit information 1121 includes the line units actually implemented in the L2 switch 1000, which indicates, for example, the line unit of which bit position in the destination unit bit map is implemented.

When handling the multicast frame or broadcast frame, the transfer destination port is not specified, and for example, 0 is allocated to the destination port number, thus indicating that the port is not specified.

With such a setting, the MAC frame is output through all the ports of all the line units implemented in the L2 switch 1000, except the port that has received the MAC frame. Such performance of outputting the MAC frame to all the ports except the port that has received the MAC frame is referred to as flooding.

On the other hand, when the destination MAC address acquired from the MAC frame proves to be designating a specific destination, the input frame transfer unit 1120 delivers the destination MAC address to the learning/retrieving unit 1160, for retrieving the learned information corresponding to the MAC address. If the corresponding learned information is available, the input frame transfer unit 1120 sets the destination unit bit map and the destination port number based on the learned information, so that the MAC frame is output only through the specific port of the specific line unit.

If the corresponding learned information is not available, the input frame transfer unit 1120 sets the destination unit bit map and the destination port number such that the MAC frame is output through all the line units implemented in the L2 switch 1000 and allocates 0 to the destination port number, like when the address indicates the multicast or broadcast, thus to perform the flooding of the MAC frame.

The transmitting side backplane interface 1130, which is a bus connection interface with the backplane, reproduces the MAC frame transferred from the input frame transfer unit 1120 to thereby transfer the MAC frame to all the paths.

The receiving side backplane interface 1140, which is a bus connection interface with the backplane, receives the MAC frame transferred from another line unit via the backplane, and the MAC frame transferred from the transmitting side backplane interface 1130 in the same line unit and returned to the same unit, and temporarily stores the MAC frame in a buffer.

The receiving side backplane interface 1140 then sequentially reads out the MAC frame stored in the buffer, and looks up the destination unit bit map of the internal frame header so as to examine the bit value corresponding to the pertinent unit number 1141 stored in itself. When the bit value designating the pertinent unit is 1, the receiving side backplane interface 1140 transfers the MAC frame to the output frame transfer unit 1150, but discards the MAC frame when the bit value is 0.

The output frame transfer unit 1150 is a processing unit that removes the internal frame header of the transferred MAC frame, and outputs the frame, from which the internal frame header has been removed, to a designated port. The designated port means all the ports when the destination port number in the internal frame header is 0, but the port corresponding to the destination port number, when such number is other than 0.

However, even when the destination port number in the internal frame header is 0, the output frame transfer unit 1150 does not output the frame to the port that has received the frame, when the MAC frame has been received by the pertinent unit. This is for avoiding duplication or looping of the frame.

The output frame transfer unit 1150 also delivers the source MAC address of the transferred MAC frame, and the receiving unit number and the receiving port number in the internal frame header added to the MAC frame to the learning/retrieving unit 1160, for learning.

The learning/retrieving unit 1160 is a processing unit that associates the source MAC address delivered by the output frame transfer unit 1150, the receiving unit number, and the receiving port number to thereby generate the learning information, and stores the learning information in a CAM 1161. The learning/retrieving unit 1160 then looks up the CAM 1161 based on the request from the input frame transfer unit 1120, and responds to the corresponding receiving unit number and receiving port number when the same MAC address as the inquired MAC address is stored.

Such a learning function minimizes the need to perform the flooding, thereby suppressing the increase in load imposed on the L2 switch 1000 and the entire network by the flooding.

Operation process of the L2 switch 1000 will now be described. The following description is made on the assumption that the network including the L2 switch 1000 is configured as FIG. 6.

Figure 6:
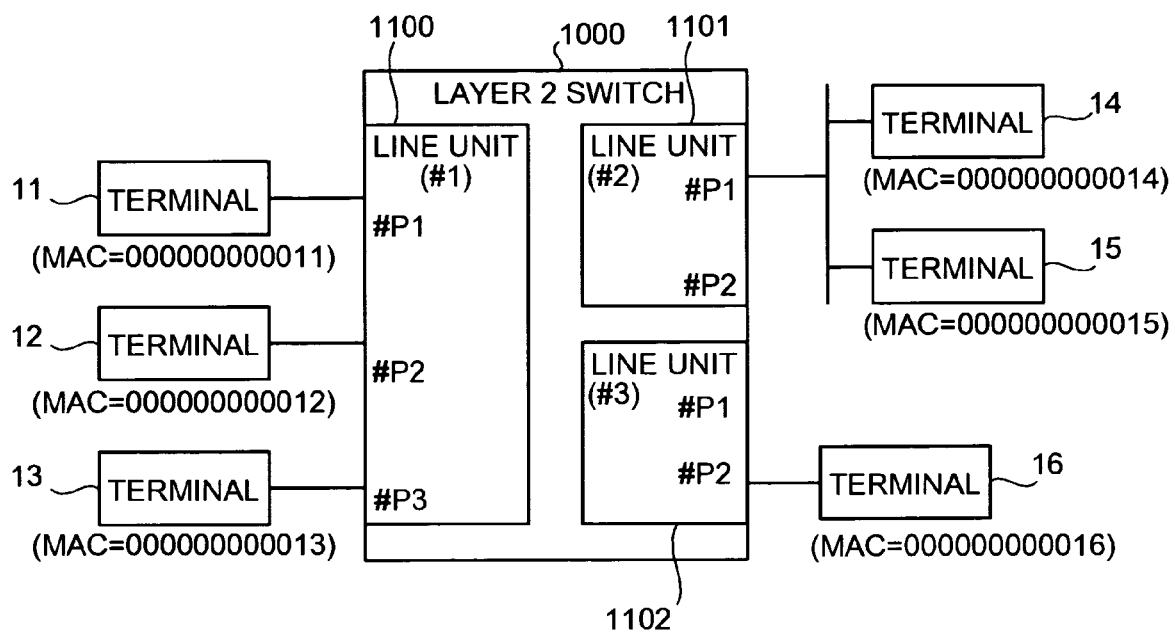
FIG. 6 is a block diagram of a network configuration.

In the example shown in FIG. 6, the L2 switch 1000 includes the line unit 1100, the line unit 1101, and the line unit 1102, and is connected to terminals 11 to 16 through the network. The line unit 1101 has the unit number of #1, the line unit 1102 has the unit number of #2, and the line unit 1102 has the unit number of #3, respectively.

The terminal 11 has the MAC address of 000000000011 in hexadecimal notation (hereinafter, the first continuous zeros in the MAC address will be omitted), and is connected to the port #P1 of the line unit 1100. The terminal 12 has the MAC address of 12, and is connected to the port #P2 of the line unit 1100. The terminal 13 has the MAC address of 13, and is connected to the port #P3 of the line unit 1100.

The terminal 14 has the MAC address of 14, and is connected to the port #P1 of the line unit 1101. The terminal 15 has the MAC address of 15, and is connected to the port #P1 of the line unit 1101. The terminal 16 has the MAC address of 16, and is connected to the port #P2 of the line unit 1102.

Figure 7:
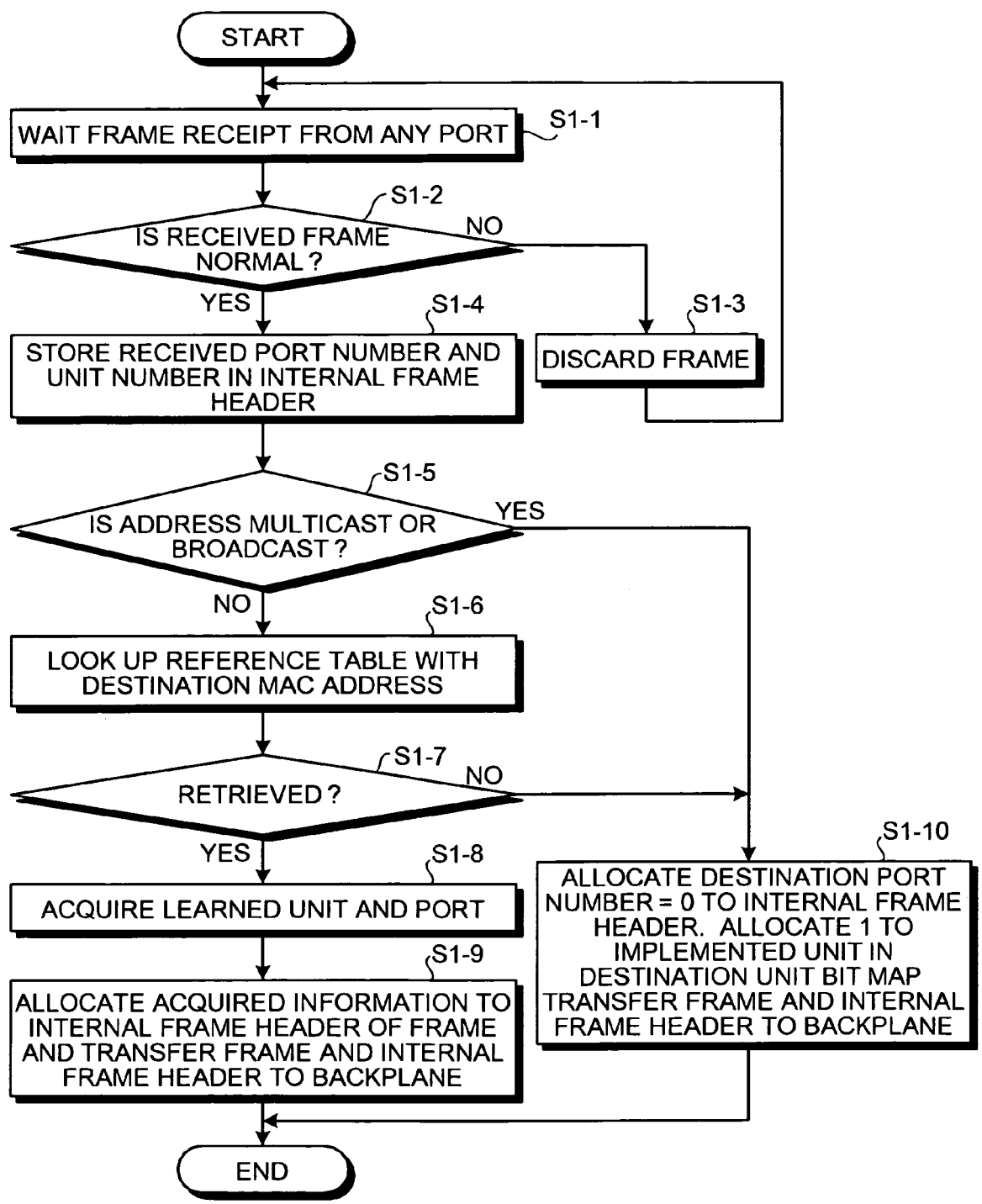
FIG. 7 is a flowchart of a process of transferring a frame received through the Ethernet® port to the transmitting side backplane interface.
Figure 8:
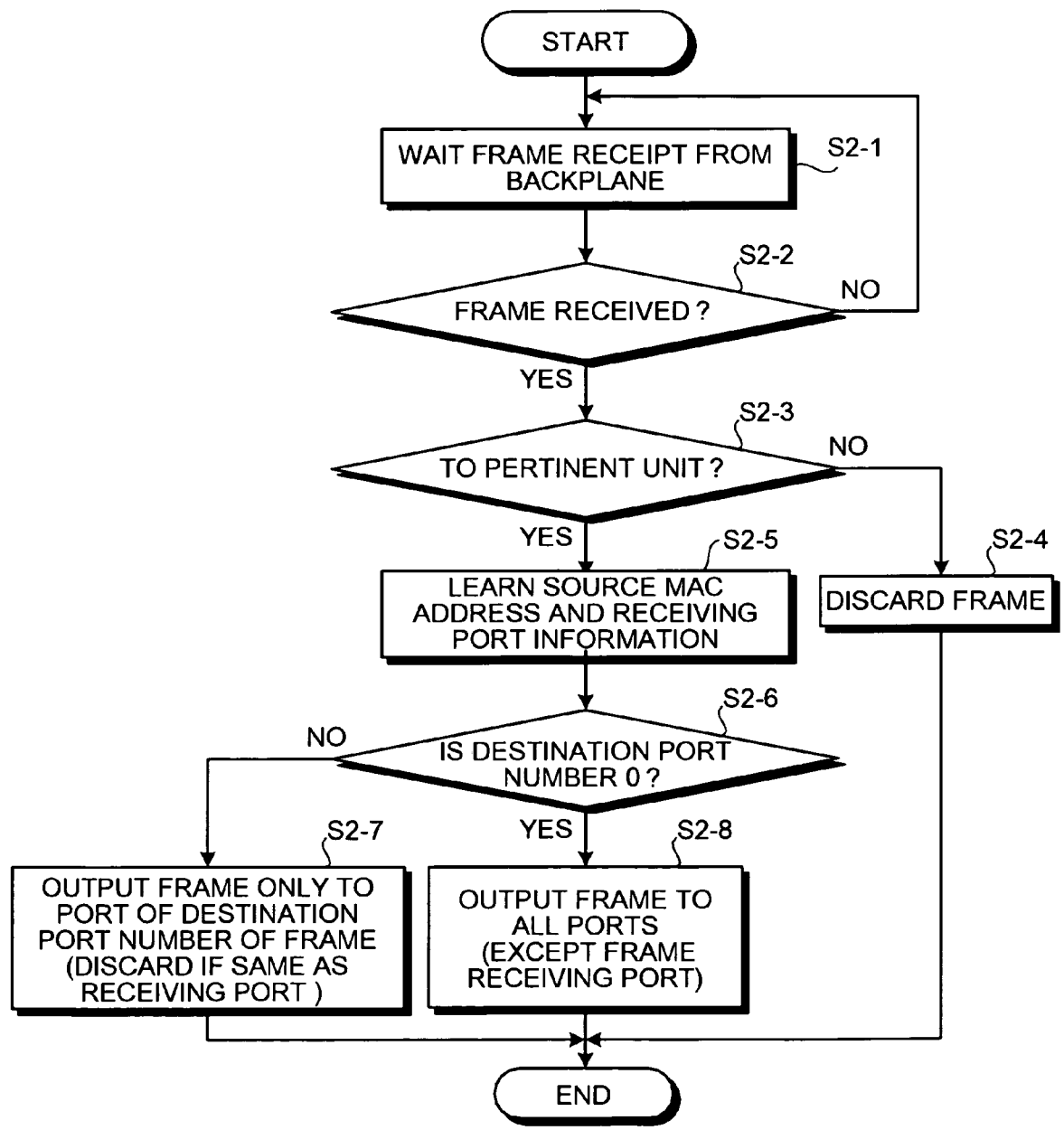
FIG. 8 is a flowchart of a process of transferring a frame received from the backplane to the Ethernet® port.

Under the network thus configured, the L2 switch 1000 operates as shown in FIGS. 7 and 8, when the terminal 11 transmits a MAC frame to the terminal 16 while the L2 switch 1000 has not learned anything on the path.

FIG. 7 is a flowchart of a process of transferring the frame received through the Ethernet® port to the transmitting side backplane interface.

The input monitoring unit 1110 of the line unit 1100 monitors the receipt of a frame from the respective Ethernet® ports (step S1-1). In this example, the MAC frame transmitted by the terminal 11 is received by the port #P1 of the line unit having the unit number of #1.

The input monitoring unit 1110 then examines whether the received MAC frame is normal. When the frame is decided to be abnormal according to the specification of the Ethernet® (No at step S1-2), the input monitoring unit 1110 discards the frame and resumes monitoring the receipt of a subsequent frame (step S1-3).

When the frame is decided to be normal (Yes at step S1-2), the input monitoring unit 1110 adds the internal frame header to the frame, and sets the numbers of the unit and the port that have received the frame as the receiving unit number and the receiving port number in the internal frame header (step S1-4). In this example, the receiving unit number is #1, and the receiving port number is #P1. The received frame is delivered to the input frame transfer unit 1120 together with the internal frame header.

The input frame transfer unit 1120 examines the destination MAC address of the frame, and allocates 0 to the destination port number in the internal frame header so as to indicate that the frame is to be subjected to flooding, when the address designates a multicast or broadcast (Yes at step S1-5), and 1 to all the implemented units in the destination unit bit map, thus to transfer the frame to the transmitting side backplane interface 1130 (step S1-10).

In this example, however, the destination MAC address is the MAC address of the terminal 11, and therefore, the input frame transfer unit 1120 decides that the frame is neither multicast nor broadcast (No at step S1-5), and causes the learning/retrieving unit 1160 to perform a retrieval of the learned information (step S1-6).

Figures 9, 10:
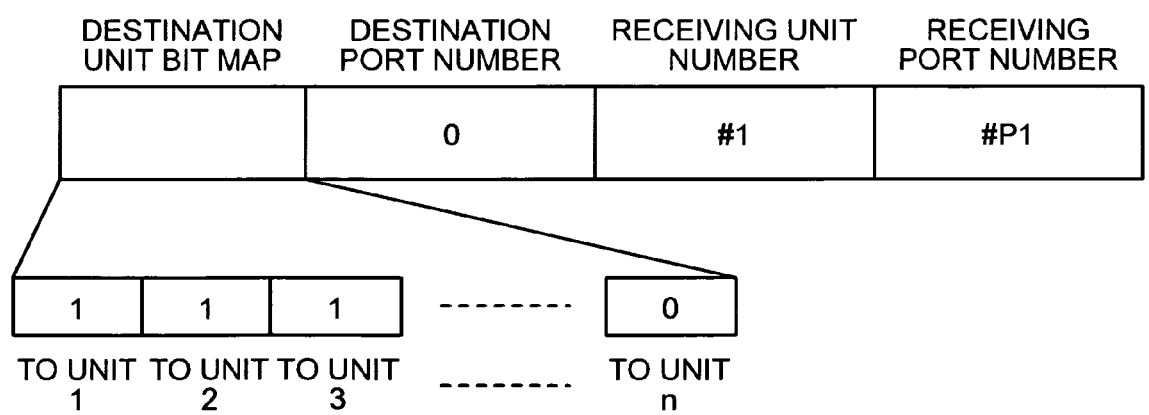
FIG. 9 is an example of a reference table.
FIG. 10 is a diagram of an internal frame header of a frame to be transferred to the backplane.

The retrieval of the learned information means examining whether the destination MAC address is registered in a reference table. FIG. 9 is an example of the reference table. As shown therein, the reference table includes the MAC address, the unit number, and the port number associated with one another and is stored in the CAM 1161. At this stage, however, the table is empty because nothing has been learned yet.

In this example, no information that accords with the destination MAC address is retrieved (No at step S1-7), and the input frame transfer unit 1120 executes the step S1-10, as with the MAC address that indicates the multicast or broadcast.

FIG. 10 is a diagram of an internal frame header of a frame to be transferred to the backplane, after the foregoing process. As shown therein, 1 is allocated to the bit corresponding to the line units 1100, 1101, and 1102 in the destination unit bit map, and 0 is allocated to the destination port number. 1 is allocated to the receiving unit number and the receiving port number, respectively.

As a result, the MAC frame with the internal frame header added thereto is transmitted to all the line units implemented in the L2 switch 1000, namely the line unit 1100, the line unit 1101, and the line unit 1102.

A process after the respective line units receive the MAC frame from the backplane will be described, based on the line unit 1102 as an example. The line unit 1102 is assumed to have the same structure as the line unit 1100.

FIG. 8 is a flowchart of a process of transferring the frame received from the backplane to the Ethernet® port.

The receiving side backplane interface 1140 monitors whether the frame transmitted from the respective units is stored in the buffer (step S2-1). When the frame is stored in the buffer (Yes at step S2-2), the receiving side backplane interface 1140 examines the destination unit bit map to decide whether the frame is addressed to the pertinent unit, but discards the frame (step S2-4) when the frame is not addressed to the pertinent unit (No at step S2-3).

In this example, however, the destination of the frame is the pertinent unit (Yes at step S2-3), and hence the frame is not discarded but transferred to the output frame transfer unit 1150, so that the output frame transfer unit 1150 delivers the source MAC address of the frame, and the receiving unit number and the receiving port number in the internal frame header to the learning/retrieving unit 1160, for registration in the reference table (step S2-5).

The output frame transfer unit 1150 examines whether the destination port number in the internal frame header is 0. In this example, the destination port number is 0 (Yes at step S2-6), and therefore, the output frame transfer unit 1150 outputs the frame, from which the internal frame header has been removed, to all the Ethernet® ports, except the port that has received the frame (step S2-8).

The foregoing process is similarly performed in the line unit 1100 and the line unit 1101. As a result, the MAC frame transmitted by the terminal 11 toward the terminal 16 is output to all the ports except the receiving port, so that the frame output from the port #P2 of the line unit 1102, i.e. the line unit of #3, can be received by the terminal 16.

Figures 11, 12:
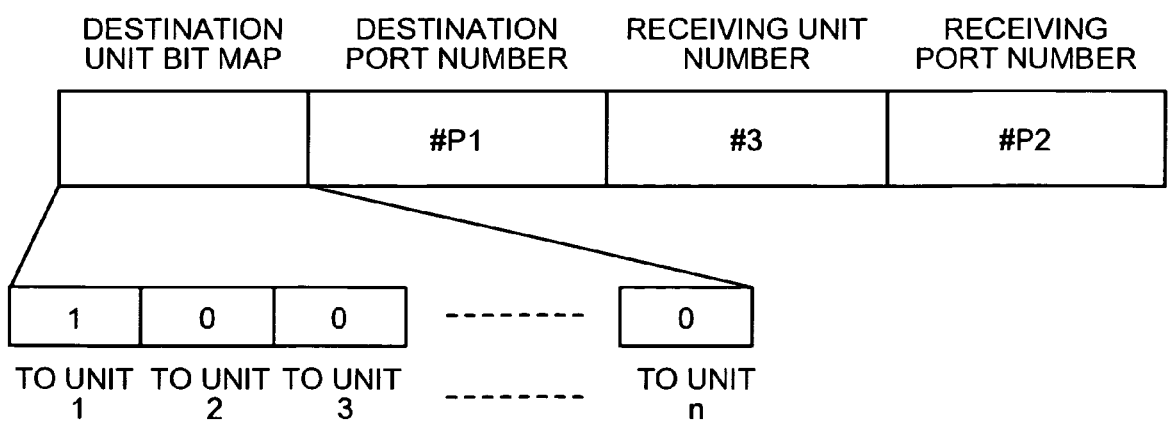
FIG. 11 is an example of the reference table after learning.
FIG. 12 is another diagram of an internal frame header of a frame to be transferred to the backplane.

At this stage, the MAC address of the terminal 11 has been learned and registered in the reference table in the respective line units. FIG. 11 is an example of the reference table after the learning. As shown therein, the source MAC address 11 of the MAC frame, the unit number #1 of the receiving line unit, and the port number #P1 of the receiving port in the receiving line unit are stored in association with one another.

Referring again to FIGS. 7 and 8, the operating process of the L2 switch 1000 for transmitting the frame reversely, i.e. from the terminal 16 to the terminal 11, will be described. This process is performed with the destination MAC address already learned.

Out of the process from the receipt of the MAC frame by the port #P2 of the line unit 1102 to the transmission of the frame to the backplane, the steps up to S1-6 in FIG. 7 are the same as the steps already described, and hence the description thereof will be omitted.

Upon looking up the reference table at the step S1-6, the input frame transfer unit 1120 decides that the MAC address is already learned (Yes at step S1-7), because the destination MAC address 11 is registered in the reference table as shown in FIG. 11. The input frame transfer unit 1120 then takes out the learned information on the unit and the port (step S1-8), and sets those numbers in the destination unit number and the destination port number in the internal frame header, and then transfers the frame to the transmitting side backplane interface 1130 (step S1-9).

FIG. 12 is a diagram of the internal frame header of the frame to be transferred to the backplane after the foregoing process. As shown in the figure, 1 is allocated only to the bit corresponding to the line unit 1100 in the destination unit bit map, and 1 is allocated to the destination port number. Then, 3 is allocated to the receiving unit number, and 2 is allocated to the receiving port number.

The frame to which the internal frame header has been added is transmitted to all the line units via the backplane bus, however, the frame is discarded in the line units other than the line unit 1100, because 1 is only allocated to the bit corresponding to the line unit 1100, in the destination unit bit map.

The following is an explanation for the process through which the line unit 1100 receivers the frame from the backplane and outputs the frame through the Ethernet® port. Out of this process, the steps up to S2-5 in FIG. 8 are the same as the steps already described, and hence the description thereof will be omitted.

After the learning by the learning/retrieving unit 1160 at the step S2-5, the output frame transfer unit 1150 examines whether 0 is allocated to the destination port number in the internal frame header. In this example, the destination port number is 1 (No at step S2-6), and hence the output frame transfer unit 1150 outputs the frame, from which the internal frame header has been removed, to the Ethernet® port (port #P1 in this example) designated by the destination port number (step S2-7).

Thus, the flooding is not performed unlike the above, because the MAC address of the terminal 11 has been learned and registered in the reference table. Also, because of the transmission of the MAC frame from the terminal 16 to the terminal 11, the MAC address of the terminal 16 is learned and registered in the reference table of the line unit 1100 as shown in FIG. 13, and therefore, when one of the terminals 11 to 13 transmits the frame to the terminal 16 the flooding is not performed.

As described above, the L2 switch 1000 performs the flooding when transferring the frame to an unlearned MAC address, but learns the source address during this process. Therefore, when the frame is subsequently transmitted reversely, the L2 switch 1000 transfers the frame only to the designated port. Such a learning function permits efficient transfer without using unnecessary frequency bands.

Meanwhile, the L2 switch may be loaded with an ATM interface function so as to connect the L2 switches in a broad ATM network, for transparently connecting a remote local area network (LAN).

For constituting such a network with the chassis-type L2 switch, it is appropriate that the L2 switch includes a line unit with an ATM interface (hereinafter, "ATM unit") and a line unit with an Ethernet® interface (Hereinafter, "Ethernet® unit") in combination.

In such a configuration, each of the line units equally has to have the learning and retrieving function of the MAC address. Furthermore, the ATM unit increases the cost of the equipment, because the ATM unit has to have an encapsulating and decapsulating function of ATM cells, in addition to the learning function.

Figure 14:
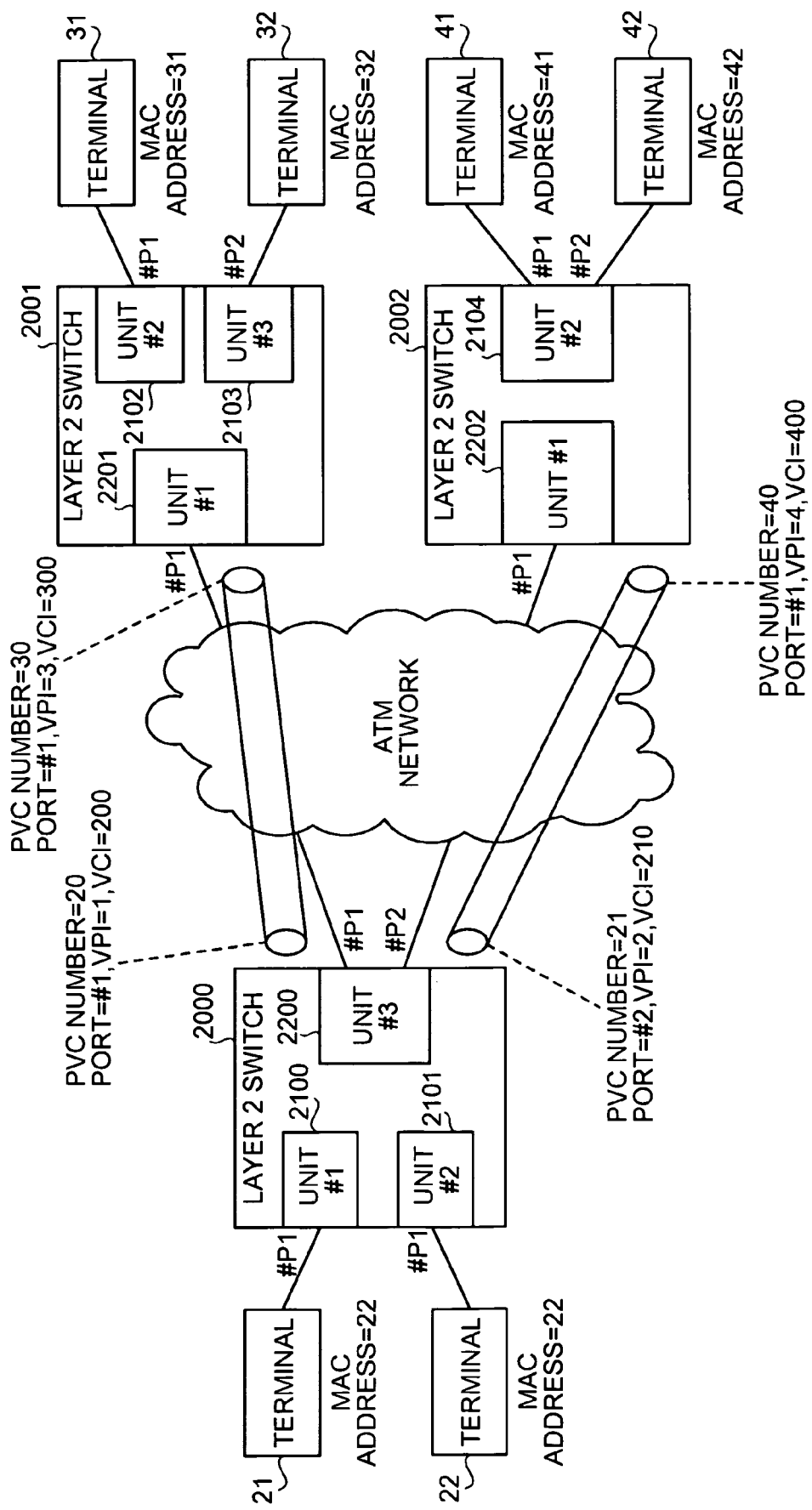
FIG. 14 is a block diagram of a network configuration including a plurality of LANs connected via an ATM network.

FIG. 14 is a block diagram of a network configuration including a plurality of LANs connected via an ATM network. As shown therein, the network connects an L2 switch 2000 and an L2 switch 2001, and the L2 switch 2000 and an L2 switch 2002 respectively, via the ATM network.

The L2 switch 2000 includes a line unit 2100 and a line unit 2101 which are Ethernet® units, and a line unit 2200 which is an ATM unit. The line unit 2100 has the unit number of #1, the line unit 2101 has the unit number of #2, and the line unit 2200 has the unit number of #3.

The L2 switch 2000 is connected to terminals 21 and 22 by a LAN. The terminal 21 has the MAC address of 21, and is connected to the port #P1 of the line unit 2100. The terminal 22 has the MAC address of 22, and is connected to the port #P1 of the line unit 2101.

The L2 switch 2001 includes a line unit 2102 and a line unit 2103 which are Ethernet units, and a line unit 2201 which is an ATM unit. The line unit 2102 has the unit number of #2, the line unit 2103 has the unit number of #3, and the line unit 2201 has the unit number of #1.

The L2 switch 2001 is connected to terminals 31 and 32 by a LAN. The terminal 31 has the MAC address of 31, and is connected to the port #P1 of the line unit 2102. The terminal 32 has the MAC address of 32, and is connected to the port #P2 of the line unit 2103.

The L2 switch 2002 includes a line unit 2104 which is an Ethernet® unit, and a line unit 2202 which is an ATM unit. The line unit 2104 has the unit number of #2, and the line unit 2202 has the unit number of #1.

The L2 switch 2002 is connected to terminals 41 and 42 by a LAN. The terminal 41 has the MAC address of 41, and is connected to the port #P1 of the line unit 2104. The terminal 42 has the MAC address of 42, and is connected to the port #P2 of the line unit 2104.

Between the respective L2 switches, a point-to-point ATM connection is provided. The MAC frame is encapsulated in ATM Adaptation Layer 5 (AAL5) and split into ATM cells, thus to be transferred through the ATM network using an ATM connection identified with the ATM port and values of VPI and VCI.

Figure 15:
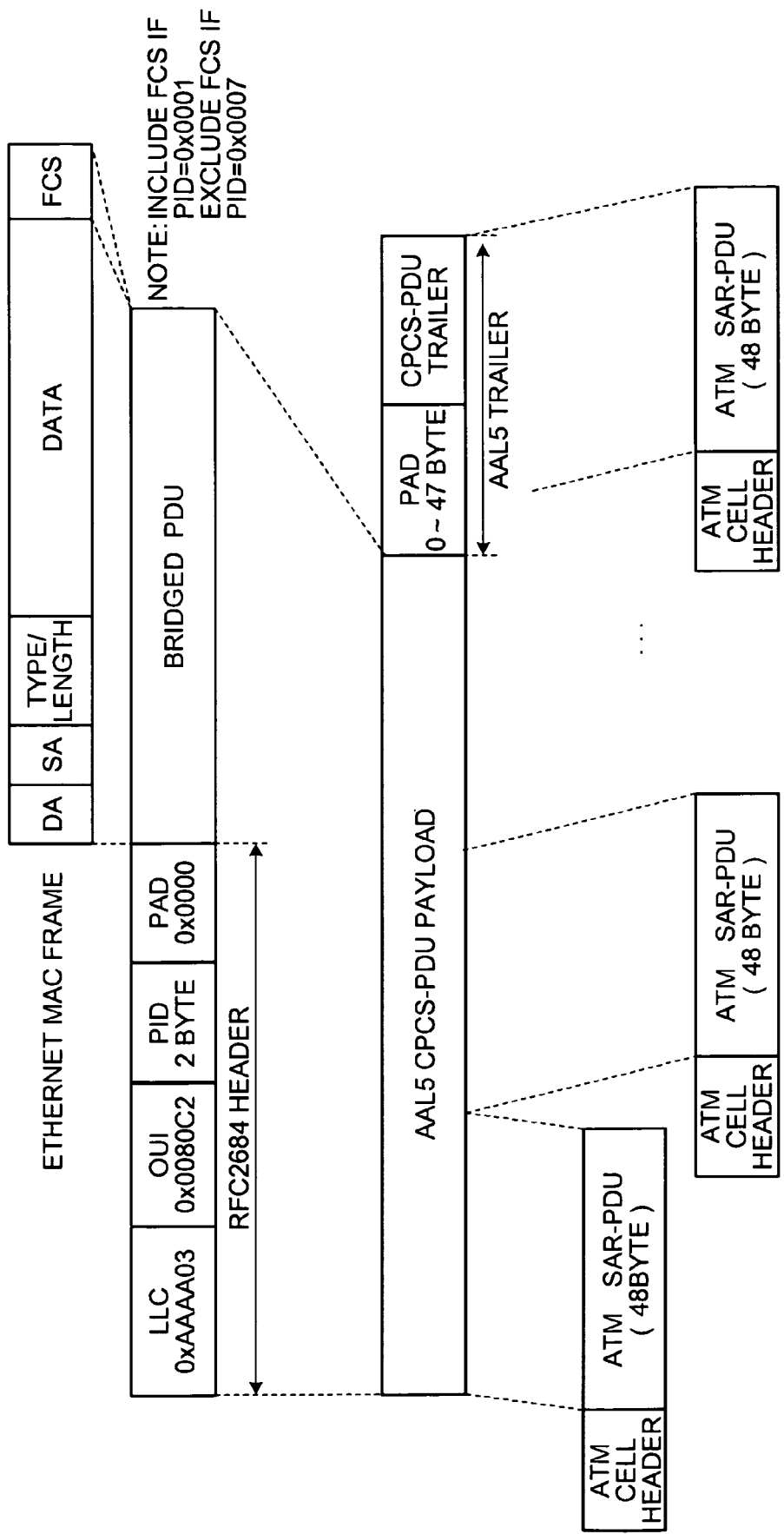
FIG. 15 is a diagram for explaining encapsulation of the MAC frame.

FIG. 15 is a diagram for explaining the encapsulation of the MAC frame. Referring to FIG. 15, first, a header prescribed in compliance with "LLC Encapsulation for Bridged Protocol" in IETF RFC2684, which is an Internet Standard, is added to the front end of the MAC frame.

The LLC and OUI of the RFC2684 header are fixed header information when transferring the MAC frame through the ATM network. PID is 2-byte information indicating whether the FCS is added to the MAC frame, and 0x001 means that the FCS is added, while 0x0007 means that the FCS is not added. PAD is a padding region, which is not yet utilized.

To the MAC frame, to which the RFC2684 header has been added, an AAL5 trailer is added to the tail of the frame, thus to turn the frame into an ATM AAL5 frame. Then the MAC frame is split into frames of 48 bytes and an ATM cell header of 5 bytes is added to each split frame thus creating ATM cells of 53 bytes to be transferred through the ATM network.

A process of decapsulating the ATM cells upon receipt thereof through the ATM interface for reassembling the MAC frame can be executed by performing the foregoing process in a reverse sequence.

The technique of encapsulating the MAC frame into the ATM cells, and of decapsulating the ATM cells to reassemble the MAC frame, are known in the art through the AAL5 function in the ATM Standard and RFC2684 of the Internet Standard, and therefore, detailed description will be omitted.

Referring to FIG. 14, configuration of the ATM connection will be described. In general, the values of VPI and VCI in the ATM connection are not the same at the terminal points of both ends. This is because the VPI and VCI values are rewritten at an ATM switch provided halfway. Accordingly, connection information is set with respect to each terminal point of the connections.

The L2 switch 2000 and the L2 switch 2001 include an ATM Permanent Virtual Connection (PVC), and the line unit 2200 side of the L2 switch 2001 is set so as to identify the PVC with a PVC number 20, port number #1, VPI 1, and VCI 200. The line unit 2201 side of the L2 switch 2001 is set so as to identify the PVC with the PVC number 30, port number #1, VPI 3, and VCI 300.

Likewise, the L2 switch 2000 and the L2 switch 2002 also include an ATM PVC, and the line unit 2200 side of the L2 switch 2000 is set so as to identify the PVC with a PVC number 21, port number #2, VPI 2, and VCI 210. The. line unit 2202 side of the L2 switch 2002 is set so as to identify the PVC with the PVC number 40, port number #1, VPI 4, and VCI 400.

A reason for employing the PVC number is to avoid an increase in the quantity of internal memory, because utilizing a combination of the port number and VPI and VCI values for identifying the ATM connection in the equipment leads to an increase in the information amount. Accordingly, the above number and values are converted into a combination of the port number and PVC number to reduce the information amount, to thereby save the internal memory.

Figure 16:
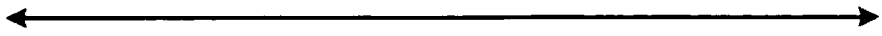
FIG. 16 is an example of a PVC number control table.
Figure 17:
FIG. 17 is another example of a PVC number control table.

For the conversion of the PVC number, the ATM includes a conversion table as shown in FIGS. 16 and 17. The table in FIG. 16 serves to provide the PVC number from the port number and VPI and VCI values. The table in FIG. 17 serves to provide the VPI and VCI values from the port number and PVC number.

The conversion table shown in FIG. 16 corresponds to a PVC number control table 2212 to be described later, and the conversion table shown in FIG. 17 corresponds to a PVC number control table 2261 to be described later. In all these tables, the correspondence among the port number, PVC number, and VPI and VCI values is registered in advance.

Hereunder, configuration of the line unit shown in FIG. 14 will be described. Description on the line unit 2100, the line unit 2101, the line unit 2102, the line unit 2103, and the line unit 2104, which are Ethernet® units, will be omitted because these are similarly configured to the line unit 1100 shown in FIG. 3. The line unit 2200, the line unit 2201, and the line unit 2202, which are ATM units, have a similar configuration to one another, and therefore, the line unit 2200 will be described as an example.

Figure 18:
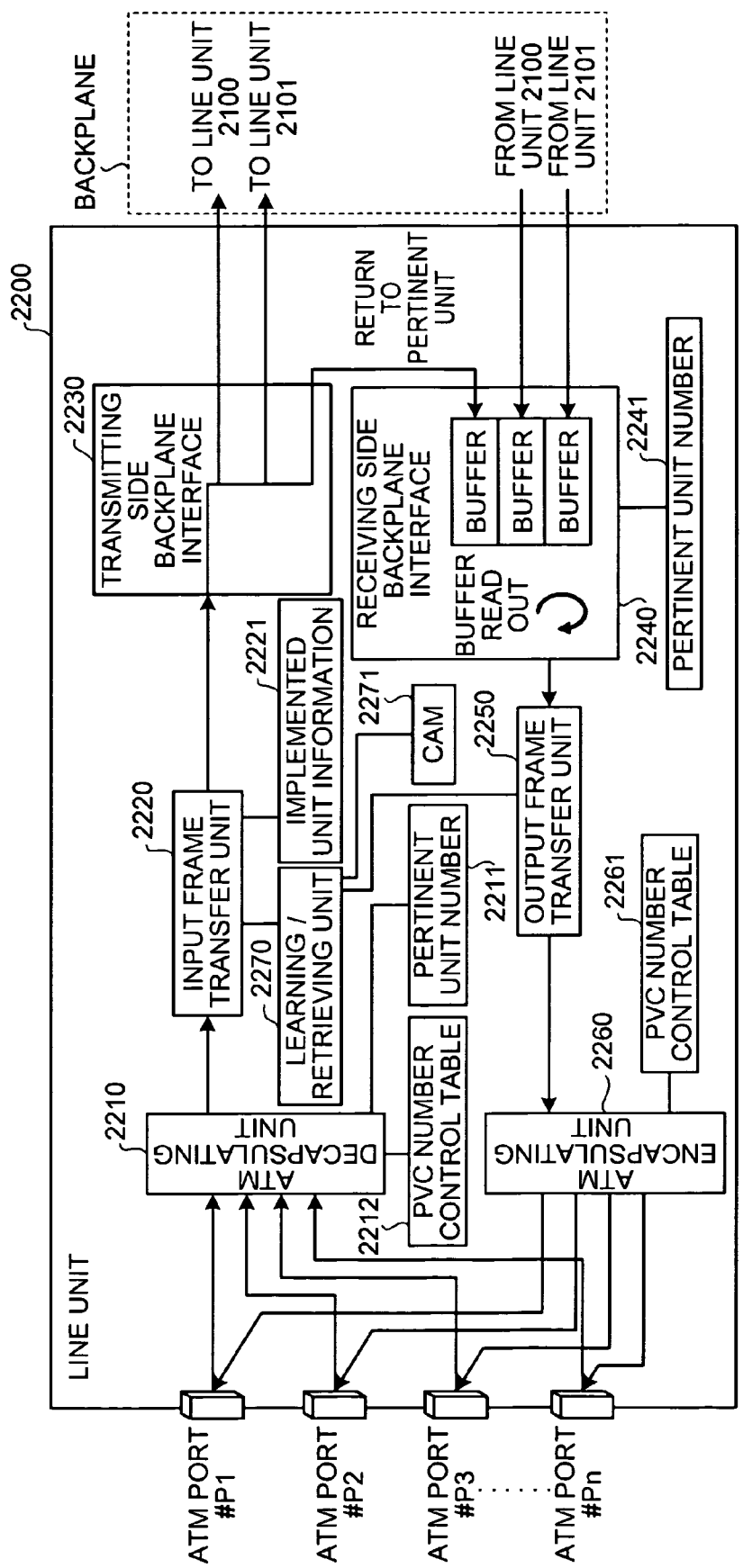
FIG. 18 is a block diagram of a configuration of a line unit that includes an ATM interface.

FIG. 18 is a block diagram of a configuration of the line unit that includes an ATM interface. As shown therein, the line unit 2200 includes at least one ATM port, an ATM decapsulating unit 2210, an input frame transfer unit 2220, a transmitting side backplane interface 2230, a receiving side backplane interface 2240, an output frame transfer unit 2250, an ATM encapsulating unit 2260, and a learning/retrieving unit 2270.

The input frame transfer unit 2220, the transmitting side backplane interface 2230, the receiving side backplane interface 2240, the output frame transfer unit 2250, and the learning/retrieving unit 2270 are similar processing units respectively to the input frame transfer unit 1120, the transmitting side backplane interface 1130, the receiving side backplane interface 1140, the output frame transfer unit 1150, and the learning/retrieving unit 1160 shown in FIG. 3. Accordingly, description on those units is omitted, and the description on a difference in the process will be included in the following passages.

The ATM decapsulating unit 2210 is a processing unit that monitors whether the respective ATM ports receive an ATM cell; performs the AAL5 assembly of reassembling the MAC frame from the received ATM cells; adds the internal frame header to such a MAC frame, and transfers the MAC frame to the input frame transfer unit 2220.

Figure 19:
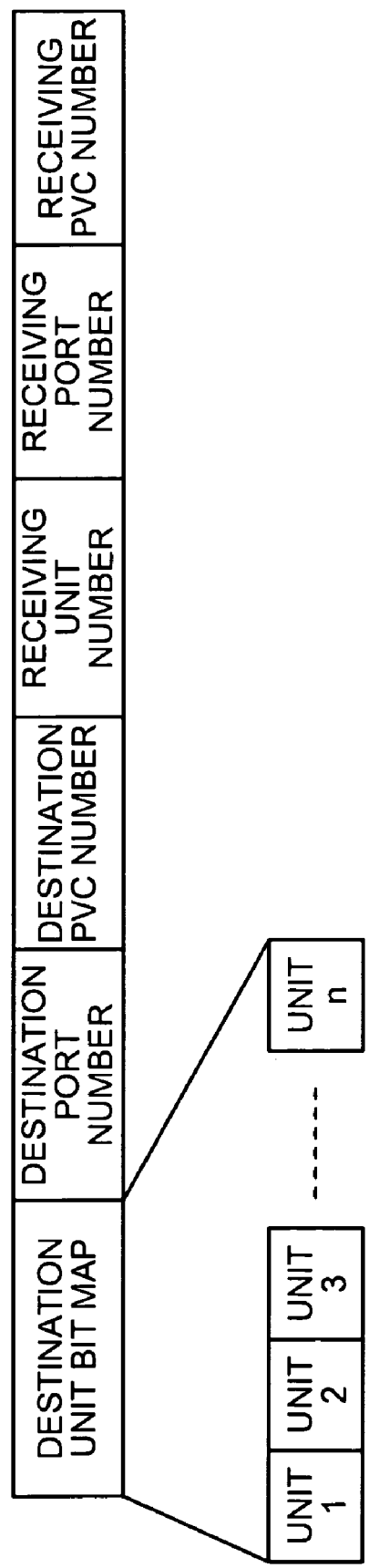
FIG. 19 is a diagram of another internal frame header format.

FIG. 19 is a diagram of an internal frame header format in the L2 switch 2000. As shown therein, the internal frame header provided in the L2 switch including the ATM unit includes items of destination PVC number and receiving PVC number, in addition to the items shown in FIG. 5. The destination PVC number serves for identifying the ATM connection at the transfer destination of the frame, and the receiving PVC number serves to identify the ATM connection that has received the frame.

The ATM decapsulating unit 2210 allocates the pertinent unit number 2211 stored in itself to the receiving unit number in the internal frame header added to the frame, and the port number of the port that has received the frame to the receiving port number. Then the ATM decapsulating unit 2210 looks up the PVC number control table 2212 stored therein utilizing the port number and VPI and VCI values as the reference key, so as to acquire the PVC number of the ATM connection that has received the ATM cells and allocates such PVC number to the receiving PVC number. The destination unit bit map, the destination port number, and the destination PVC number are left in the initial state.

The ATM encapsulating unit 2260 is a processing unit that removes the internal frame header from the MAC frame transferred from the output frame transfer unit 2250, and encapsulates the frame now without the internal frame header into ATM cells and outputs the ATM cells to the ATM port.

The ATM encapsulating unit 2260 looks up the PVC number control table 2261 stored therein utilizing the destination port number and the destination PVC number as the reference key, when the destination port number in the internal frame header is not 0, thus to acquire the VPI and VCI values of the ATM connection, so as to transmit the ATM cells to the ATM connection identified with the VPI and VCI values.

On the other hand, when the destination port number in the internal frame header is 0, the ATM encapsulating unit 2260 transmits the ATM cells to all the ATM connections registered in the PVC number control table 2261.

Now an operation process of the L2 switch shown in FIG. 14 will be described. First, the L2 switch 2000 and the L2 switch 2001 operate as shown in FIGS. 20 to 23 when the terminal 21 transmits a MAC frame to the terminal 31, while the L2 switches have not learned anything on the path.

The format of the MAC frame transmitted from the terminal 21 is as shown in FIG. 4, i.e. the destination MAC address is set as 31 and the source MAC address is set as 21.

Figures 24, 25:
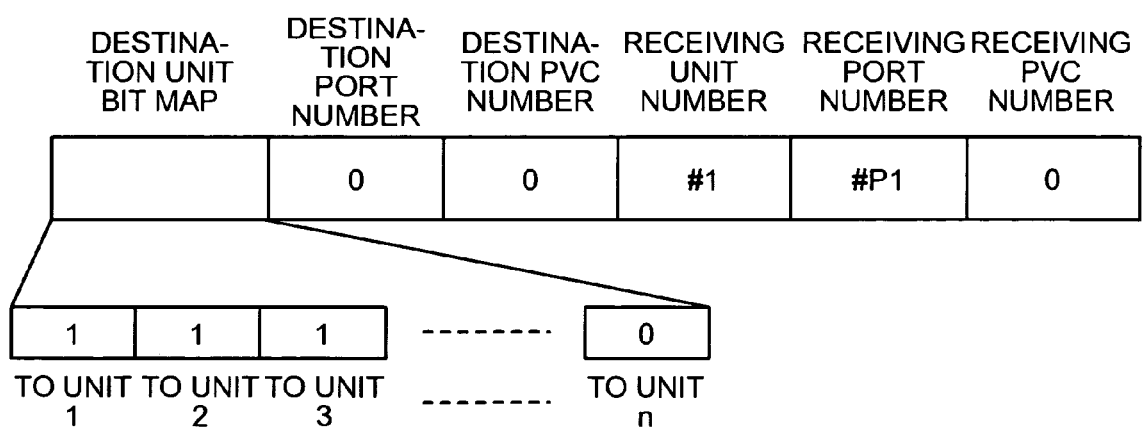
FIG. 24 is another example of the reference table.
FIG. 25 is still another diagram of an internal frame header of a frame to be transferred to the backplane.

Also, at the time that the MAC frame has been transmitted from the terminal 21, the reference table of each line unit has no content yet as shown in FIG. 24. Here, as shown in FIG. 24, the reference table in each Ethernet®0 unit shown in FIG. 14 has an additional column for the PVC number, in comparison with the reference table of FIG. 9.

Figure 20:
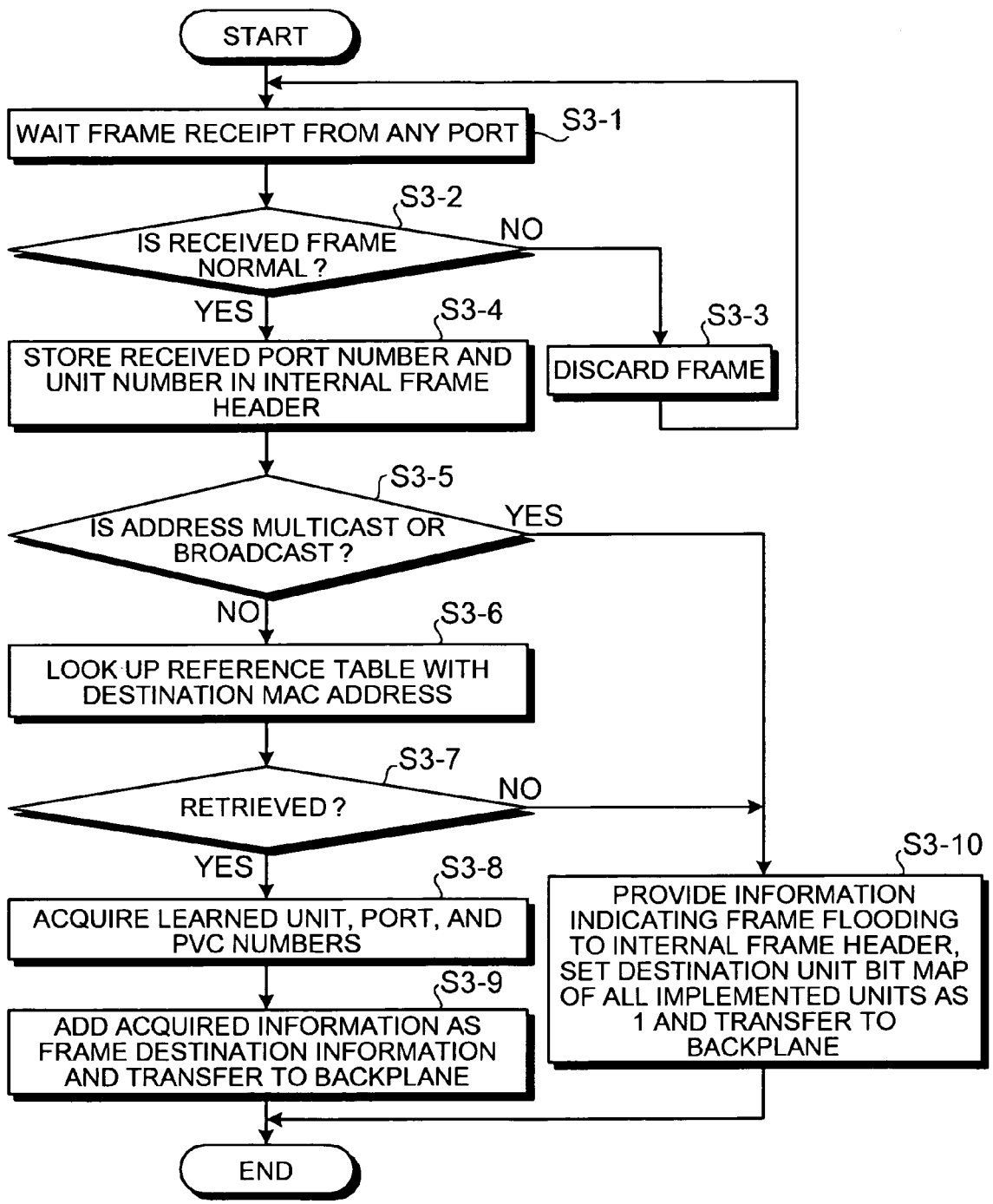
FIG. 20 is a flowchart of a process of transferring a frame received through the Ethernet® port to the backplane, performed by the unit that includes the Ethernet® interface.

FIG. 20 is a flowchart of a process of transferring the frame received through the Ethernet® port to the backplane, performed by the unit that includes the Ethernet® interface.

Out of the process from the receipt of the MAC frame by the port #P1 of the line unit 2100 to the transmission of the frame to the backplane, the steps up to S3-7 shown in FIG. 20 are the same as the steps already described, and hence the description thereof will be omitted.

The input frame transfer unit 1120 decides that the MAC address has not been learned (No at step S3-7), because the reference table has no content yet as shown in FIG. 24, and sets the internal frame header so as to perform the flooding (step S3-10).

The input frame transfer unit 1120 allocates 0 to the destination port number and the destination PVC number in the internal frame header, as information indicating that the frame is to be subjected to the flooding, and allocates 1 to the bit of all the implemented units in the destination unit bit map, and then transmits the frame to the transmitting side backplane interface 1130.

FIG. 25 is a diagram of the internal frame header of the frame to be transferred to the backplane as a result of the above steps. As shown therein, 1 is allocated to the bit corresponding to the line unit 2100, the line unit 2101, and the line unit 2200 in the destination unit bit map, and 0 is allocated to the destination port number and the destination PVC number.

Then the receiving unit number is set as 1, which is the unit number of the line unit 2100, and the receiving port number is set as 1, which is the port number of the port that has received the frame. Also, the receiving PVC number is set as 0 because the frame has not been received from the ATM interface.

Figure 21:
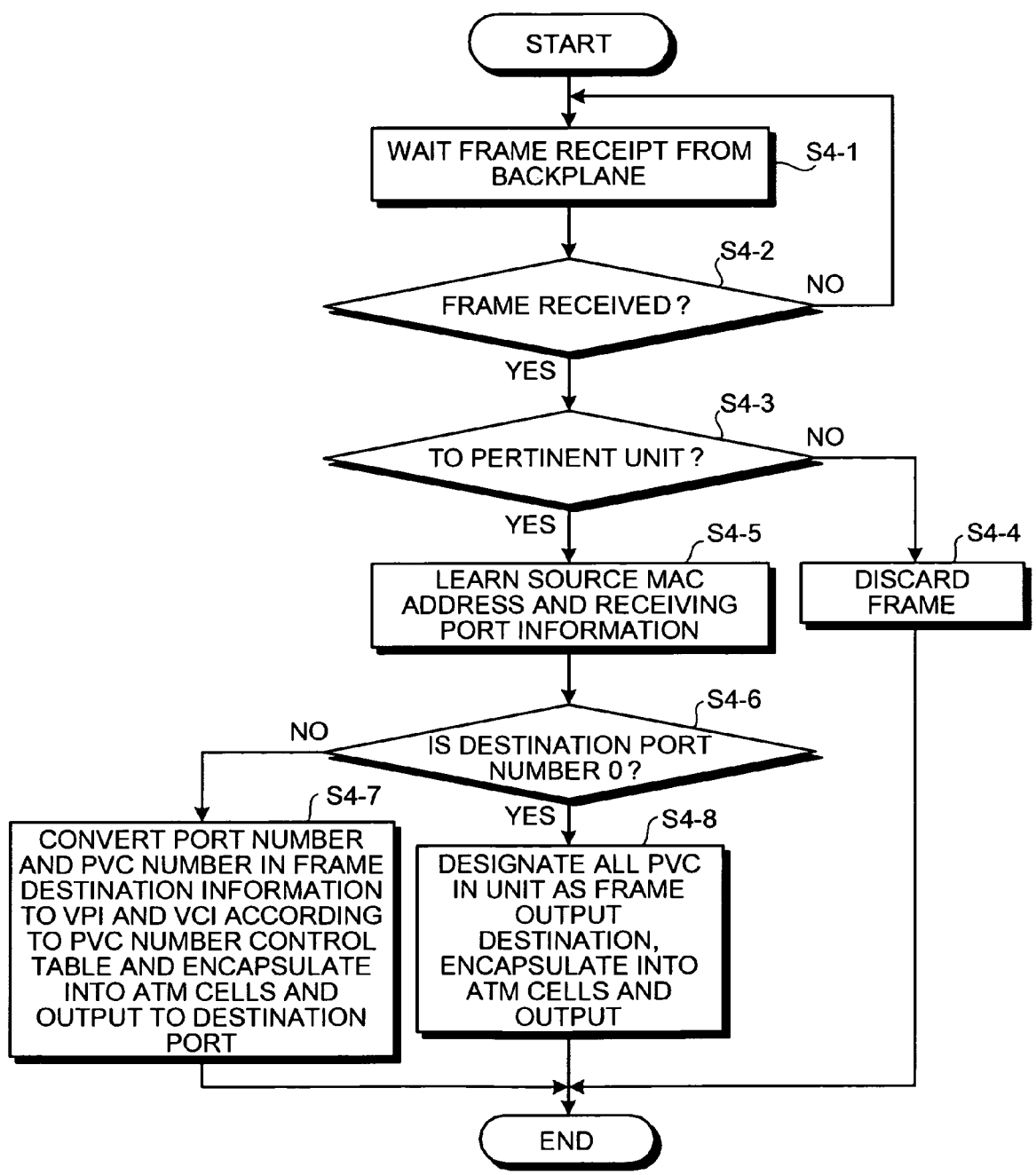
FIG. 21 is a flowchart of a process of encapsulating. the frame received from the backplane into ATM cells and transferring the ATM cells to the ATM port, performed by the unit that includes the ATM interface.

FIG. 21 is a flowchart of a process of encapsulating the frame received from the backplane into ATM cells and transferring the ATM cells to the ATM port, performed by the unit that includes the ATM interface.

The receiving side backplane interface 2240 monitors whether the frame transmitted from the respective units is stored in the buffer (step S4-1). When the frame is stored in the buffer (Yes at step S4-2), the receiving side backplane interface 2240 examines the bit of the destination unit bit map corresponding to the pertinent unit number 2241 stored in itself thus to decide whether the frame is addressed to the pertinent unit, but discards the frame (step S4-4) when the frame is not addressed to the pertinent unit (No at step S4-3).

In this example, however, the destination of the frame is the pertinent unit (Yes at step S4-3), and hence the frame is not discarded but transferred to the output frame transfer unit 2250, so that the output frame transfer unit 2250 delivers the source MAC address of the frame, and the receiving unit number and the receiving port number in the internal frame header to the learning/retrieving unit 2270, for registration in the reference table (step S4-5).

The output frame transfer unit 2250 transfers the frame to the ATM encapsulating unit 2260, which examines whether the destination port number in the internal frame header is 0. In this example, the destination port number is 0 (Yes at step S4-6), and therefore, the ATM encapsulating unit 2260 encapsulates the frame, from which the internal frame header has been removed, into ATM cells and outputs the ATM cells to all the ATM connections referring to the PVC number control table 2261 stored in itself (step S4-8).

As a result of the foregoing, the MAC frame transmitted by the terminal 21 toward the terminal 31 is transmitted to the line unit 2201 of the L2 switch 2001 and the line unit 2202 of the L2 switch 2002. Here, the frame transmitted by the line unit 2100 to the backplane is received also by the line unit 2100 and the line unit 2101, to be thereby transmitted to all the ports by flooding, except the receiving port of the frame.

Now in the respective line units of the L2 switch 2000, the MAC address of the terminal 21 is learned and registered in the reference table. FIG. 26 is an example of the reference table in the ATM unit after the learning. As shown therein, the source MAC address 21 of the MAC frame, the unit number #1 of the receiving line unit, and the port number #P1 of the receiving port in the receiving line unit are stored in association with one another.

Figure 22:
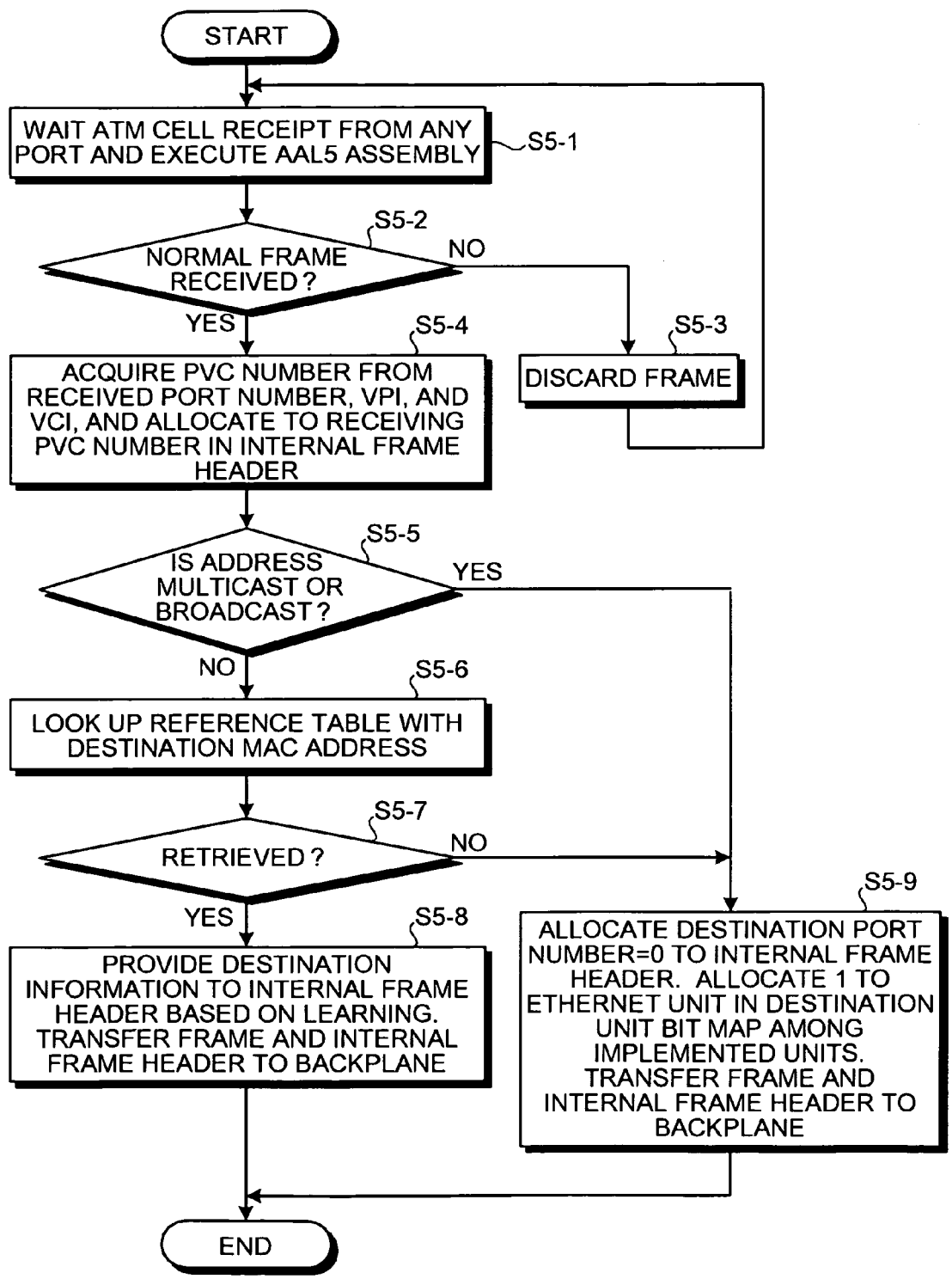
FIG. 22 is a flowchart of a process of transferring to the backplane the frame encapsulated into ATM cells received through the ATM port, performed by the unit that includes the ATM interface.

After the line unit 2201 of the L2 switch 2001 receives the frame encapsulated into the ATM cells, the following process is performed. FIG. 22 is a flowchart of a process of transferring to the backplane the frame encapsulated into the ATM cells received through the ATM port, performed by the unit that includes the ATM interface.

The ATM decapsulating unit 2210 of the line unit 2201 monitors the receipt of the ATM cells from the respective ATM ports, and decapsulates the received ATM cells thus to reassemble the frame (step S5-1). In this example, the ATM cells are received through the port #P1 of the line unit having the unit number of #1.

The ATM decapsulating unit 2210 then examines whether the decapsulated frame is normal. When the frame is decided to be abnormal based on the specification of the Ethernet® (No at step S5-2), the ATM decapsulating unit 2210 discards the frame and resumes monitoring the receipt of subsequent ATM cells (step S5-3).

When the frame is decided to be normal (Yes at step S5-2), the ATM decapsulating unit 2210 adds the internal frame header to the frame, and sets the numbers of the unit and the port that have received the ATM cells as the receiving unit number and the receiving port number in the internal frame header. The ATM decapsulating unit 2210 also looks up the PVC number control table 2212 stored therein, utilizing the number of the port that has received the ATM cells and the VPI and VCI of the ATM connection as the reference key, to thereby acquire the PVC number, and allocates the PVC number to the receiving PVC number in the internal frame header, after which the ATM decapsulating unit 2210 transfers the frame to the input frame transfer unit 2220 (step S5-4).

The input frame transfer unit 2220 examines the destination MAC address of the frame, and allocates 0 to the destination port number and the destination PVC number in the internal frame header so as to indicate that the frame is to be subjected to flooding, when the address designates a multicast or broadcast (Yes at step S5-5), and also allocates 1 to all the Ethernet® units in the destination unit bit map, thus to transfer the frame to the transmitting side backplane interface 2230 (step S5-9).

The input frame transfer unit 2220 sets the destination unit bit map so as to designate only the Ethernet® unit among the implemented units when performing the flooding. This is because performing the flooding of the frame received by the ATM unit to the ATM side impedes efficiently utilizing the frequency band of the ATM network.

Accordingly, implemented unit information 2221 stored in the input frame transfer unit 2220 includes identification information on whether it is the Ethernet® unit or the ATM unit, with respect to each line unit. FIG. 27 is a table of the implemented unit information 2221. As shown therein, the implemented unit information 2221 stored in the input frame transfer unit 2220 of the line unit 2201 includes information on the type of unit, as well as whether each unit is implemented.

In this example, the destination MAC address is that of the terminal 31, and hence the input frame transfer unit 2220 decides that the MAC address is neither multicast nor broadcast (No at step S5-5), and causes the learning/retrieving unit 2270 to look up the reference table (step S5-6).

The reference table has no content yet in this example, and therefore, the information that accords with the MAC address is not retrieved (No at step S5-7), and the input frame transfer unit 2220 executes the step S5-9, in a similar manner to when the destination MAC address indicates multicast or broadcast.

Figures 28, 29:
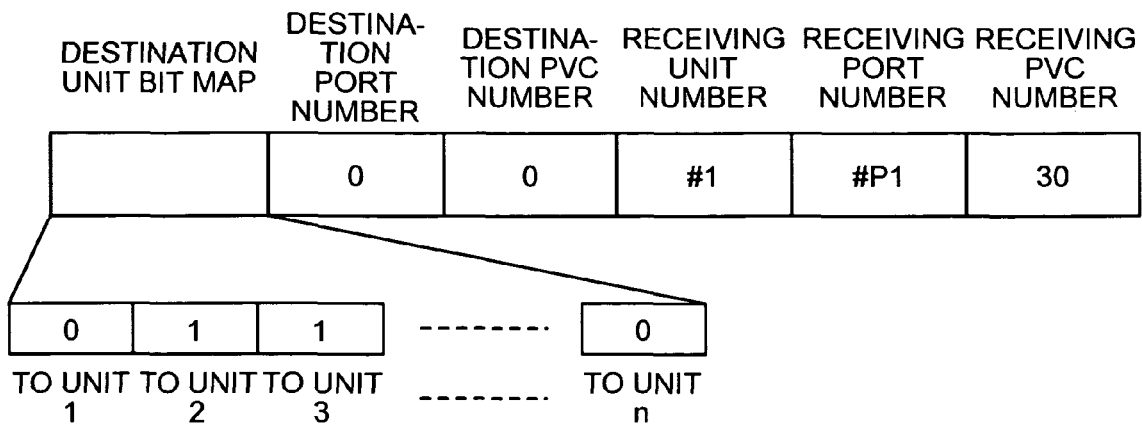
FIG. 28 is still another diagram of an internal frame header of a frame to be transferred to the backplane.
FIG. 29 is still another example of the reference table after learning.

FIG. 28 is a diagram of the internal frame header of the frame transferred to the backplane as a result of the foregoing process. As shown therein, 1 is allocated to the bit corresponding to the line unit 2102 and the line unit 2103 in the destination unit bit map, and 0 is allocated to the bit corresponding to the line unit 2201, which is the ATM unit. Then 0 is allocated to the destination port number and the destination PVC number, while 1 is allocated to the receiving unit number and the receiving port number, and 30 to the receiving PVC number.

As a result of the foregoing, the MAC frame transmitted to the backplane is received by the line unit 2102 and the line unit 2103, but discarded at the line unit 2201. Hereunder, a process after the respective line units receive the MAC frame from the backplane will be described, based on the line unit 2102 as an example.

Figure 23:
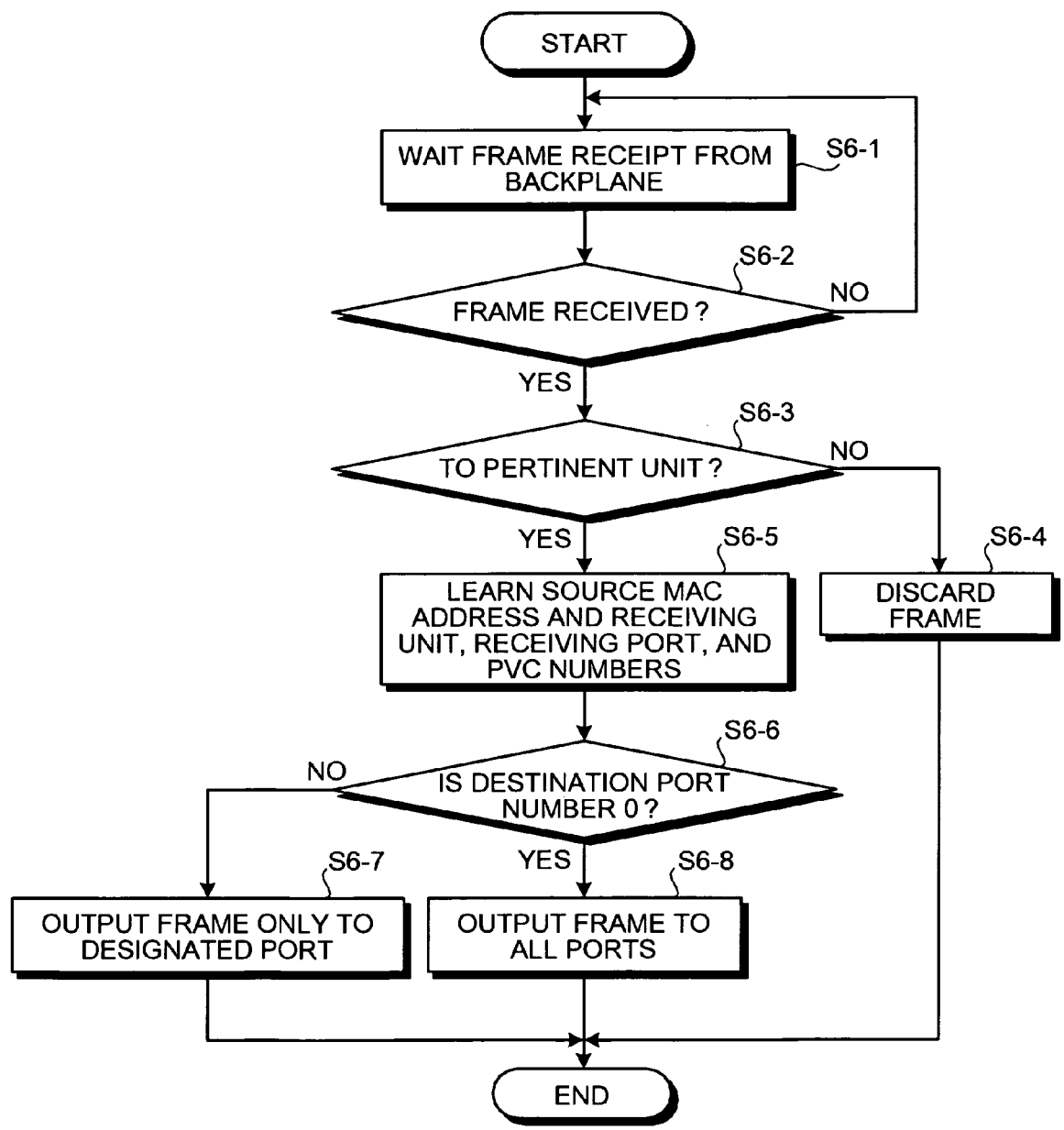
FIG. 23 is a flowchart of a process of transferring a frame received from the backplane to the Ethernet® port, performed by the unit that includes the Ethernet® interface.

FIG. 23 is a flowchart of a process of transferring the frame received from the backplane to the Ethernet® port, performed by the unit that includes the Ethernet® interface.

Out of the process from the receipt of the MAC frame from the backplane by the line unit 2102 to the transmission of the frame to the Ethernet® port, the steps up to S6-4 shown in FIG. 23 are the same as the steps already described, and hence the description thereof will be omitted.

In this example, the destination of the frame is the pertinent unit (Yes at step S6-3), and hence the frame is not discarded but transferred to the output frame transfer unit 1150. The output frame transfer unit 1150 delivers the source MAC address of the frame, and the receiving unit number and the receiving port number in the internal frame header to the learning/retrieving unit 1160, for registration in the reference table (step S6-5).

The output frame transfer unit 1150 examines whether the destination port number in the internal frame header is 0. In this example, the destination port number is 0 (Yes at step S6-6), and therefore, the output frame transfer unit 1150 outputs the frame, from which the internal frame header has been removed, to all the Ethernet® ports (step S6-8).

As a result of the foregoing, the MAC frame transmitted by the terminal 21 toward the terminal 31 is output to all the Ethernet® ports in the line unit 2102, so that the frame output from the port #P1 reaches the terminal 31.

The frame transmitted by the line unit 2201 to the backplane is also received by the line unit 2103, and is subjected to flooding through all the Ethernet® ports. Also, the ATM cells transmitted by the line unit 2200 to the ATM network are also received by the line unit 2202 of the L2 switch 2002, and transmitted to the line unit 2104 via the backplane upon being reassembled to the MAC frame, thus to be subjected to flooding through all the Ethernet® ports.

As a result, the MAC address of the terminal 21 is learned and registered in the reference table in the respective Ethernet® units in the L2 switch 2001 and the L2 switch 2002. FIG. 29 is an example of the reference table in the line unit 2102 after the learning. As shown therein, the source MAC address 21 of the MAC frame, the unit number #1 of the receiving line unit, the port number #P1 of the receiving port in the receiving line unit, and the PVC number 30 of the ATM connection that has received the ATM cells are stored in association with one another.

Referring again to FIGS. 20 to 23, the operating process of transmitting the frame reversely, i.e. from the terminal 31 to the terminal 21, will be described. This process is performed with the destination MAC address already learned.

The format of the MAC frame transmitted from the terminal 31 is as shown in FIG. 4, i.e. 21 is allocated to the destination MAC address and 31 to the source MAC address.

Out of the process from the receipt of the MAC frame by the line unit 2102 through the port #P1 to the transmission of the frame to the backplane, the steps up to S3-6 shown in FIG. 20 are the same as the steps already described, and hence the description thereof will be omitted.

Upon looking up the reference table at the step S3-6, the input frame transfer unit 1120 decides that the MAC address is already learned (Yes at step S3-7), because the destination MAC address 21 is registered in the reference table as shown in FIG. 29. The input frame transfer unit 1120 then takes out the learned information on the unit, the port, and the PVC (step S3-8), and sets those numbers in the destination unit bit map, the destination port number, and the destination PVC number in the internal frame header, and then transfers the frame to the transmitting side backplane interface 1130 (step S3-9).

Figure 30:
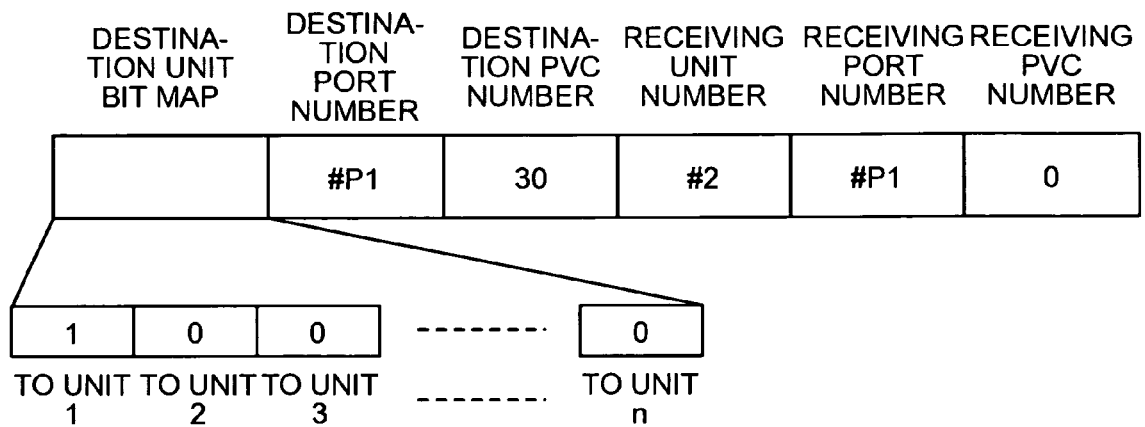
FIG. 30 is still another diagram of an internal frame header of a frame to be transferred to the backplane.

FIG. 30 is a diagram of the internal frame header of the frame to be transferred to the backplane, after the foregoing process. As shown therein, 1 is allocated only to the bit corresponding to the line unit 2201 in the destination unit bit map, 1 to the destination port number, and 30 to the destination PVC number. Then 2 is allocated to the receiving unit number, 1 to the receiving port number, and 0 to the receiving PVC number.

The frame to which the internal frame header has been added is transmitted to all the line units via the backplane bus, however, the frame is discarded in the line units other than the line unit 2201, because 1 is only allocated to the bit corresponding to the line unit 2201 in the destination unit bit map.

The following passages cover the process through which the line unit 2201 receives the frame from the backplane and outputs the frame through the ATM port after encapsulating the frame. Out of this process, the steps up to S4-5 in FIG. 21 are the same as the steps already described, and hence the description thereof will be omitted.

After the output frame transfer unit 2250 makes the learning/retrieving unit 2270 learn at the step S4-5, the ATM encapsulating unit 2260 examines whether 0 is allocated to the destination port number in the internal frame header. In this example, the destination port number is 1 (No at step S4-6), and therefore,. the ATM encapsulating unit 2260 encapsulates the frame, into ATM cells from which the internal frame header has been removed, and looks up the PVC number control table 2261 stored therein, utilizing the destination port number and the destination PVC number as the reference key to thereby acquire the VPI and VCI values, and outputs the ATM cells to the ATM connection identified with the destination port number and the VPI and VCI values.

As a result of the foregoing, the MAC frame transmitted by the terminal 31 toward the terminal 21 is transmitted to the PVC having the VPI=3 and VCI=300 through the port #P1 of the line unit 2201 of the L2 switch 2001, and received by the PVC having the VPI=1 and VCI=200 through the port #P1 of the line unit 2200 of the L2 switch 2000, via the ATM network.

Out of the process from the receipt of the ATM cells by the line unit 2200 through the port #P1, to the reassembly to the MAC frame and the transmission of the MAC frame to the backplane, the steps up to S5-6 shown in FIG. 22 are the same as the steps already described, and hence the description thereof will be omitted.

Upon looking up the reference table at the step S5-6, the input frame transfer unit 1120 decides that the MAC address is already learned (Yes at step S5-7), because the destination MAC address 21 is registered in the reference table as shown in FIG. 26. The input frame transfer unit 2220 then takes out the learned information on the unit and the port, and sets those numbers in the destination unit number and the destination port number in the internal frame header respectively, and then transfers the frame to the transmitting side backplane interface 2230 (step S5-8).

Figure 31:
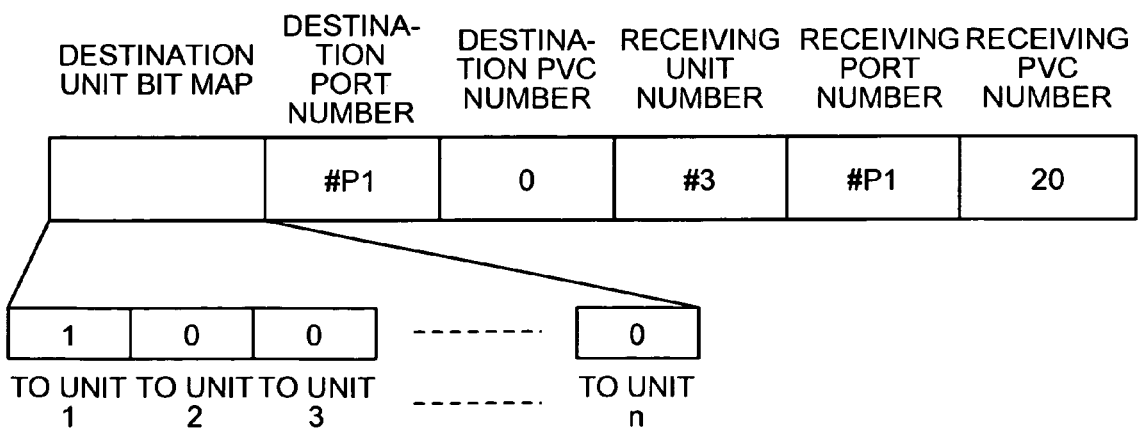
FIG. 31 is still another diagram of an internal frame header of a frame to be transferred to the backplane.

FIG. 31 is a diagram of the internal frame header of the frame to be transferred to the backplane after the foregoing process. As shown in the figure, 1 is allocated only to the bit corresponding to the line unit 2100 in the destination unit bit map, 1 to the destination port number, and 0 to the destination PVC number. Then, 3 is allocated to the receiving unit number, 1 to the receiving port number, and 20 to the receiving PVC number.

The following passages cover the process through which the line unit 2100 receivers the frame from the backplane and outputs the frame through the Ethernet® port. Out of this process, the steps up to S6-5 in FIG. 23 are the same as the steps already described, and hence the description thereof will be omitted.

After the learning by the learning/retrieving unit 1160 at the step S6-5, the output frame transfer unit 1150 examines whether 0 is allocated to the destination port number in the internal frame header. In this example, the destination port number is 1 (No at step S6-6), and therefore, the output frame transfer unit 1150 outputs the frame, from which the internal frame header has been removed, to the Ethernet® port (port #P1 in this example) designated by the destination port number (step S6-7).

As a result of the foregoing, the MAC frame transmitted by the terminal 31 toward the terminal 21 is output to the port #P1 of the line unit 2100, so that the terminal 21 can receive the frame. At this stage, the MAC address of the terminal 31 has been learned and registered in the reference table in the respective line units.

Thus, the flooding of the frame transmitted by the terminal 31 to the terminal 21 is not performed unlike in the stage where the learning has not been executed, because the MAC address of the terminal 21 is now learned and registered in the reference table. Also, when the terminal 21 subsequently transmits the frame to the terminal 31 the flooding is not performed, because the MAC address of the terminal 31 is learned and registered in the reference table.

As described through the foregoing passages, the conventional L2 switch includes a reference table for learning, in each of the line units including the ATM units, so as to avoid unnecessary flooding thus to efficiently utilize the frequency band. Recently, however, the progress in operation speed of the networks is requiring a reduction in latency of the transfer transactions, thereby making it essential to perform quicker retrieval of the reference table. For quicker retrieval it is necessary to employ the expensive CAM as the storage medium of the reference table, which leads to an increase in the cost of the transmitting apparatus.

As shown in FIG. 15, the PAD region in the RFC2684 header added to the MAC frame when encapsulating the MAC frame into ATM cells is a reserved region, which is not currently utilized. The frame transfer method according to an embodiment of the present invention utilizes the 2 bytes of the PAD region, to enable efficiently transferring the frame without depending on the reference table.

Figure 32:
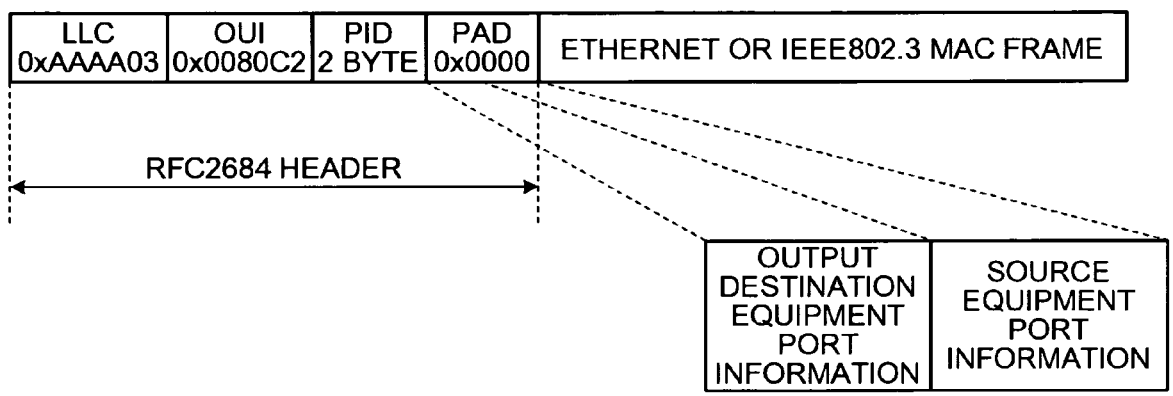
FIG. 32 is a diagram of a RFC2684 header format according to an embodiment of the present invention.

FIG. 32 is a diagram of a RFC2684 header format according to the present embodiment. A first byte of the PAD region is allocated to output destination equipment port information, and a second byte to source equipment port information.

The source equipment port information is to include position information of the Ethernet® port that has received the frame, when encapsulating the frame received through the Ethernet® port into ATM cells and outputting the ATM cells to the ATM network. According to the present embodiment the L2 switch is of the chassis-type, and hence the Ethernet® port position information includes a combination of a unit number and a port number. Meanwhile, in an L2 switch other than the chassis-type, a port number may be able to constitute the port position information.

In the L2 switch, upon receipt of the frame from the ATM network, the source MAC address, as well as the unit number and the port number indicating the position where the frame has been received in the L2 switch, are learned and registered in the reference table included in Ethernet® units as conventionally performed, and additionally the source equipment port information, to be registered in the first byte of the PAD region in the RFC2684 header, is learned.

The output destination equipment port information is to include the source equipment port information acquired from the reference table utilizing the destination MAC address as the reference key, when encapsulating the frame received through the Ethernet® port into ATM cells and outputting the ATM cells to the ATM network. The information indicates the position of the port through which the frame is to be output in the destination L2 switch.

According to the present embodiment, the upper four bits of the one byte are allocated to the unit number and the lower four bits to the port number, for retaining the combination of the unit number and the port number in the one byte. In the subsequent description, the port position information of the port #P2 of the unit #1 will be expressed as 12 in hexadecimal notation.

In the L2 switch that has received the frame including the port position information in the second byte of the PAD region of the RFC2684 header, the reference table is not looked up, but the port through which the frame is output is decided based on the port information.

Embedding thus in the frame to be transmitted via the ATM network the position information indicating the port in the pertinent equipment that has received the frame, and deciding the port through which the frame is to be output based on the position information when the position information is included in the frame transmitted by another L2 switch, allows avoiding unnecessary flooding and thus efficiently transferring the frame, without depending on the reference table.

For example, the L2 switch that has received the Ethernet® frame encapsulated into ATM cells from the ATM network can output the Ethernet® frame decapsulated from the ATM cells to an appropriate destination port, without looking up the reference table.

Also, in the conventional unit compatible with the ATM network, a corresponding port is registered in the reference table based on the SA of the Ethernet® frame decapsulated from the ATM cells, so as to look up the reference table based on the DA of the Ethernet® frame transferred from another unit, thus to transfer the frame to the corresponding port. In the unit according to the present embodiment compatible with the ATM network, as stated earlier, adding the internal frame header to the Ethernet® frame encapsulated into ATM cells from the ATM network based on the embedded position information enables transferring the frame to the appropriate unit and port, and transferring the Ethernet® frame from another unit to the appropriate port according to the internal frame header thereof, thus eliminating the need to look up the reference table. Therefore, the learning/retrieving unit 2270 that performs registration in and retrieval from the reference table, and a CAM 2271 that stores the reference table shown in FIG. 18 are no longer necessary, and hence the cost corresponding to the learning/retrieving unit and the CAM can be reduced.

Figure 33:
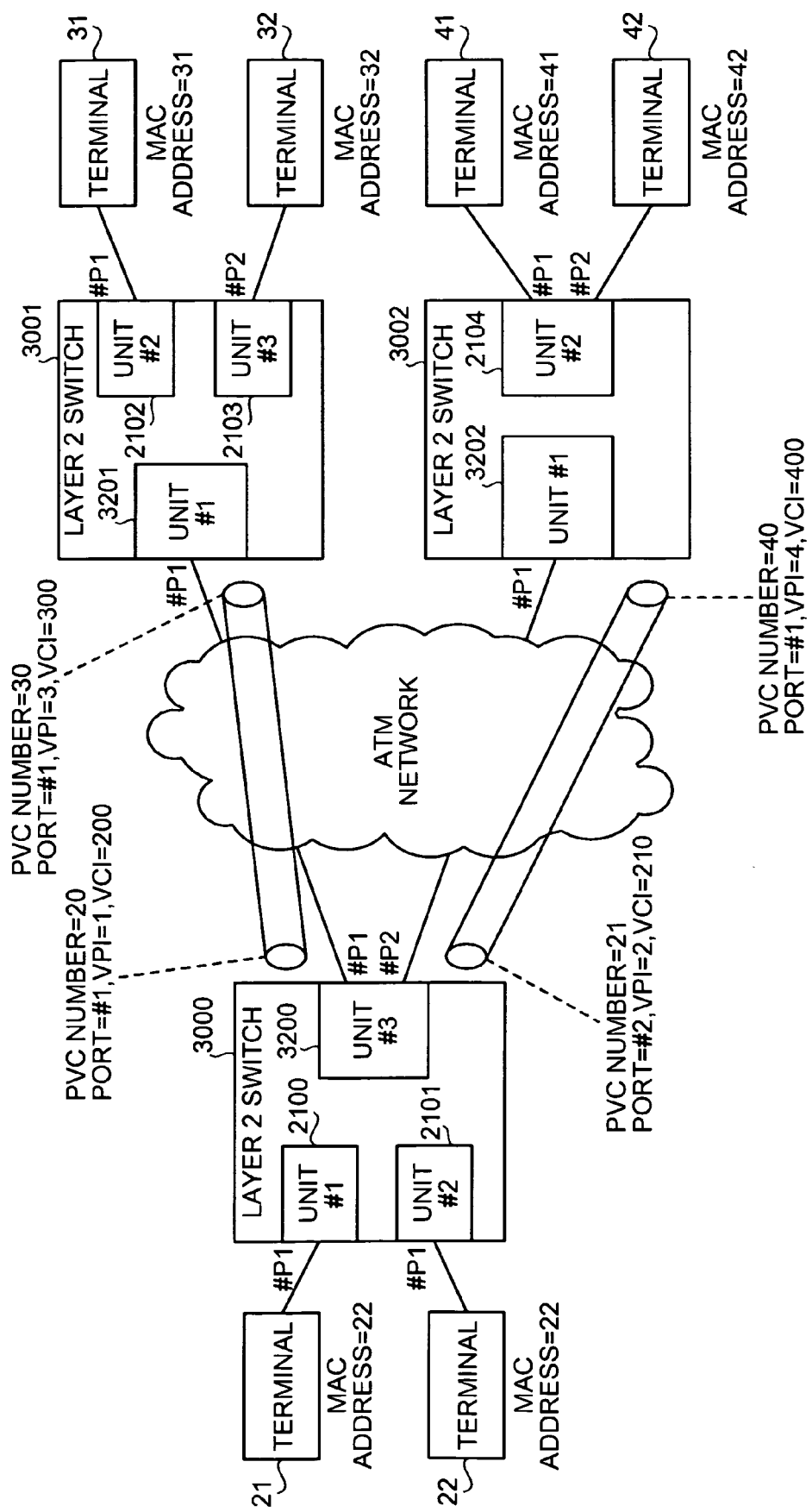
FIG. 33 is a block diagram of a network configuration including a plurality of LANs connected via an ATM network.

FIG. 33 is a block diagram of a network configuration including a plurality of LANs connected via an ATM network. The network shown therein includes an L2 switch 3000, an L2 switch 3001, and an L2 switch 3002, in place of the L2 switch 2000, the L2 switch 2001, and the L2 switch 2002 included in the network shown in FIG. 12.

The L2 switch 3000 is the same as the L2 switch 2000 shown in FIG. 14, except for including a line unit 3200 as an ATM unit instead of the line unit 2200. The L2 switch 3001 is the same as the L2 switch 2001 except for including a line unit 3201 instead of the line unit 2201, and the L2 switch 3002 is the same as the L2 switch 2002 except for including a line unit 3202 instead of the line unit 2202.

The line unit 2100, the line unit 2101, the line unit 2102, the line unit 2103, and the line unit 2104, which are all Ethernet® units, are of similar configuration to the line unit 1100 shown in FIG. 3, and hence the description thereof will be omitted. Also, the line unit 3200, the line unit 3201, and the line unit 3202, which are the ATM units, have a similar configuration to one another, and therefore, the line unit 3200 will be described as an example.

Figure 34:
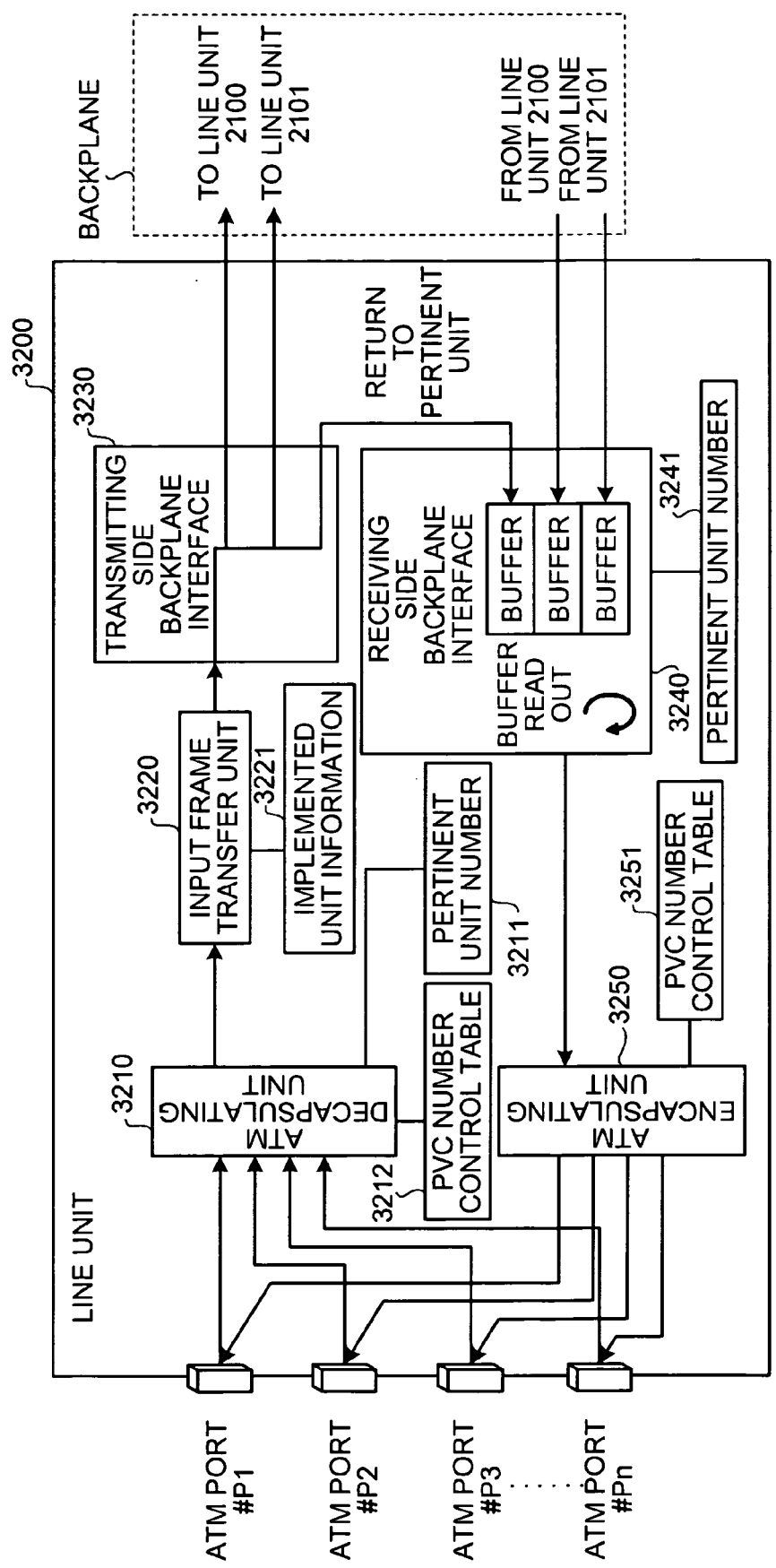
FIG. 34 is a block diagram of a configuration of a line unit that includes an ATM interface.

FIG. 34 is a block diagram of a configuration of a line unit that includes an ATM interface. As shown therein, the line unit 3200 includes at least one ATM port, an ATM decapsulating unit 3210, an input frame transfer unit 3220, a transmitting side backplane interface 3230, a receiving side backplane interface 3240, and an ATM encapsulating unit 3250.

The transmitting side backplane interface 3230 and the receiving side backplane interface 3240 are processing units similar to the transmitting side backplane interface 2230 and the receiving side backplane interface 2240 shown in FIG. 18 respectively, and hence the description thereof will be omitted.

The ATM decapsulating unit 3210 is a processing unit that monitors whether the respective ATM ports receive ATM cells, performs the AAL5 assembly of reassembling the MAC frame from the received ATM cells, adds the internal frame header to such MAC frame, and transfers the MAC frame to the input frame transfer unit 3220.

Figure 35:
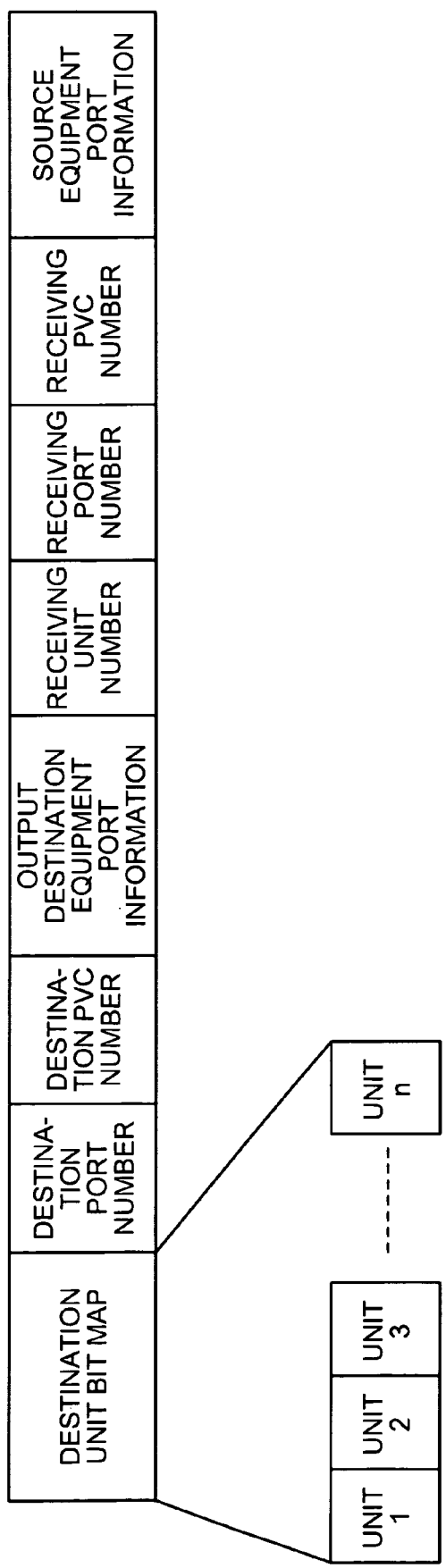
FIG. 35 is a diagram of an internal frame header format.

FIG. 35 is a diagram of a format of an internal frame header added in the L2 switch 3000. The internal frame header added in the L2 switch 3000 according to the present embodiment includes the output destination equipment port information and the source equipment port information, in addition to the items shown in FIG. 19.

The output destination equipment port information serves to specify the learned source equipment port information, when the Ethernet® unit has already learned the destination MAC address, and is placed in the output destination equipment port information in the PAD region of the RFC2684 header, when encapsulating the frame in the ATM unit.

The source equipment port information serves to specify position information of the Ethernet® port that has received the frame in the L2 switch that transmits the frame to the ATM network, and is placed in the source equipment port information in the PAD region of the RFC2684 header, when encapsulating the frame in the ATM unit. Such information is learned in the Ethernet® unit of the L2 switch that receives the frame via the ATM network together with the receiving unit number and so on, in association with the source MAC address.

The ATM decapsulating unit 3210 allocates the pertinent unit number 3211 stored in itself to the receiving unit number in the internal frame header added to the frame, and the port number of the port that has received the ATM cells to the receiving port number. Then the ATM decapsulating unit 3210 looks up a PVC number control table 3212 stored therein utilizing the port number and VPI and VCI values as the reference key, so as to acquire the PVC number of the ATM connection that has received the ATM cells and allocates such a PVC number to the receiving PVC number.

To the output destination equipment port information and the source equipment port information, the output destination equipment port information and the source equipment port information in the PAD region of the RFC2684 header of the received frame are allocated, respectively. The destination unit bit map, the destination port number and the destination PVC number are left in the initial state.

The input frame transfer unit 3220 is a processing unit that decides the transfer destination of the MAC frame, provides the decision into the internal frame header, and then transfers the MAC frame to the transmitting side backplane interface 3230.

The input frame transfer unit 3220 looks up the output destination equipment port information in the internal frame header and allocates, when the value is 00, the information indicating the flooding to the internal frame header. The input frame transfer unit 3220 allocates 0 to the destination port number and the destination PVC number, and 1 to all the bits corresponding to the Ethernet® units in the destination unit bit map referring to implemented unit information 3221 stored in itself.

When the output destination equipment port information is other than 00, the input frame transfer unit 3220 regards the upper four bits as the unit number, and allocates 1 to the bit corresponding to that unit number in the destination unit bit map, and regards the lower four bits as the port number and allocates that number to the destination port number.

The ATM encapsulating unit 3250 is a processing unit that removes the internal frame header from the MAC frame transferred from the receiving side backplane interface 3240; encapsulates the frame now without the internal frame header into ATM cells; and outputs the ATM cells to the ATM port.

The ATM encapsulating unit 3250 looks up a PVC number control table 3251 stored therein utilizing the destination port number and the destination PVC number as the reference key, when the destination port number in the internal frame header is not 0, thus to acquire the VPI and VCI values of the ATM connection, so as to transmit the ATM cells to the ATM connection identified with the VPI and VCI values.

At this stage, the ATM encapsulating unit 3250 allocates the value of the output destination equipment port information in the internal frame header to the first byte in the PAD region of the RFC2684 header. Then the ATM encapsulating unit 3250 allocates the value of the receiving unit number in the internal frame header to the upper four bits of the second byte, and the value of the receiving port number to the lower four bits.

When the destination port number in the internal frame header is 0, the ATM encapsulating unit 3250 transmits the ATM cells to all the ATM connections registered in the PVC number control table 3251. At this stage, the ATM encapsulating unit 3250 allocates 00 to the first byte of the PAD region of the RFC2684 header, the value of the receiving unit number in the internal frame header to the upper four bits of the second byte, and the value of the receiving port number to the lower four bits.

Thus, the ATM unit according to the present embodiment does not depend on the reference table when transferring the frame, and hence eliminates the need to include the expensive CAM, thereby reducing the cost of the equipment as a whole.

The L2 switch 3000 and the L2 switch 3001 operate as shown in FIGS. 36 to 39 when the terminal 21 transmits a MAC frame toward the terminal 31, while the L2 switches have not learned anything on the path.

The format of the MAC frame transmitted from the terminal 21 is as shown in FIG. 4, i.e. the destination MAC address is set as 31 and the source MAC address is set as 21.

Also, at the time that the MAC frame has been transmitted from the terminal 21, the reference table of each Ethernet® unit has no content yet as shown in FIG. 40. Here, as shown in FIG. 40, the reference table in each Ethernet® unit shown in FIG. 33 has an additional column for the source equipment port information, in comparison with the reference table of FIG. 24.

Figure 36:
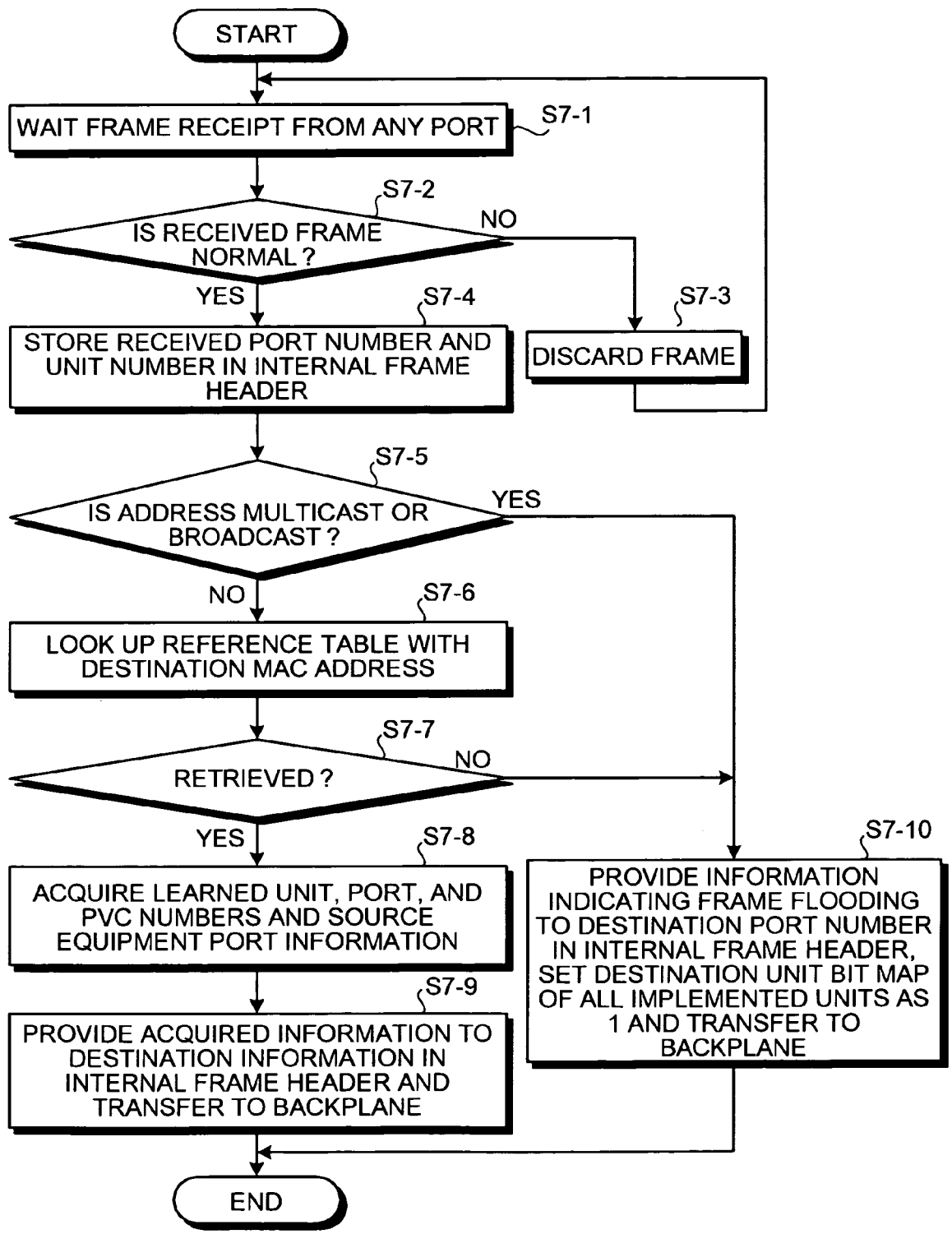
FIG. 36 is a flowchart of a process of transferring a frame received through the Ethernet® port to the backplane, performed by a unit that includes the Ethernet® interface.

FIG. 36 is a flowchart of a process of transferring the frame received through the Ethernet® port to the backplane, performed by the unit that includes the Ethernet® interface.

Out of the process from the receipt of the MAC frame by the line unit 2100 through the port #P1, to the transmission of the MAC frame to the backplane, the steps up to S7-7 shown in FIG. 36 are the same as the steps already described, and hence the description thereof will be omitted.

The input frame transfer unit 1120 decides that the MAC address has not been learned (No at step S7-7), because the reference table has no content yet as shown in FIG. 40, and sets the internal frame header so as to perform the flooding (step S7-10).

The input frame transfer unit 1120 allocates 0 to the destination port number and the destination PVC number in the internal frame header, as information indicating that the frame is to be subjected to the flooding, and allocates 00 to the output destination equipment port information. Then the input frame transfer unit 1120 allocates 1 to the bit of all the implemented units in the destination unit bit map, and then transmits the frame to the transmitting side backplane interface 1130.

Figure 41:
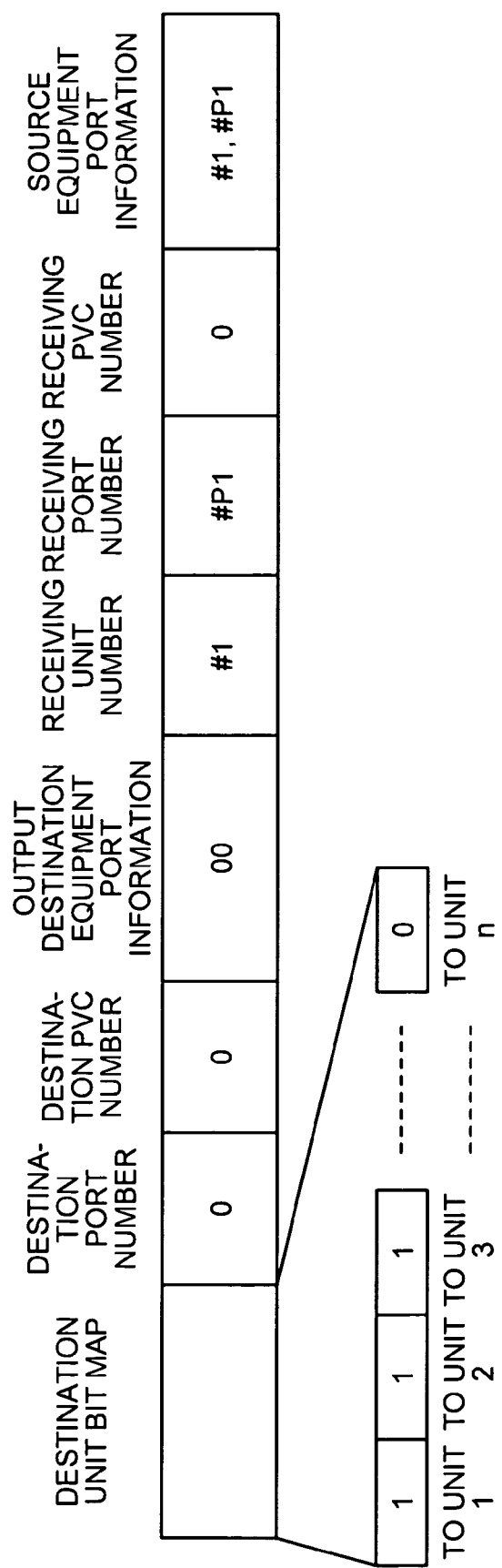
FIG. 41 is a diagram of an internal frame header of a frame to be transferred to the backplane.

FIG. 41 is a diagram of the internal frame header of the frame to be transferred to the backplane, after the foregoing process. As shown therein, 1 is allocated to the bit corresponding to the line unit 2100, the line unit 2101, and the line unit 3200 in the destination unit bit map, 0 to the destination port number and the destination PVC number, and 00 to the output destination equipment port information.

Then the receiving unit number is set as 1, which is the unit number of the line unit 2100; the receiving port number is set as 1, which is the port number of the port that has received the frame; and 11 to the source equipment port information. Also, the receiving PVC number is set as 0 because the frame has not been received from the ATM interface.

Figure 37:
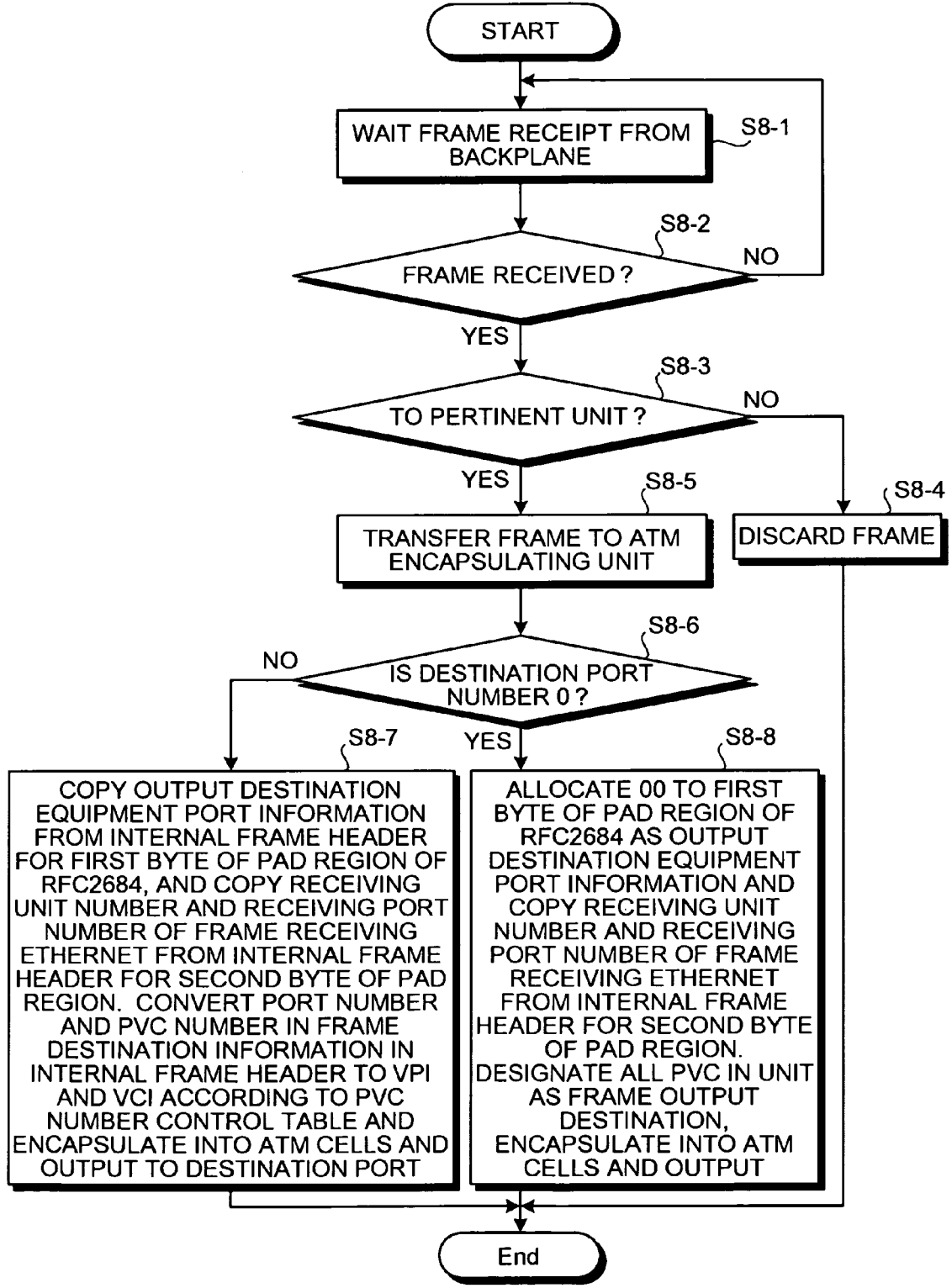
FIG. 37 is a flowchart of a process of encapsulating the frame received from the backplane into ATM cells and transferring the ATM cells to the ATM port, performed by the unit that includes the ATM interface.

FIG. 37 is a flowchart of a process of encapsulating the frame received from the backplane into ATM cells and transferring the ATM cells to the ATM port, performed by the unit that includes the ATM interface.

The receiving side backplane interface 3240 monitors whether the frame transmitted from the respective units is stored in the buffer (step S8-1). When the frame is stored in the buffer (Yes at step S8-2), the receiving side backplane interface 3240 examines the bit of the destination unit bit map corresponding to the pertinent unit number 3241 stored in itself thus to decide whether the frame is addressed to the pertinent unit, but discards the frame (step S8-4) when the frame is not addressed to the pertinent unit (No at step S8-3).

In this example, the destination of the frame is the pertinent unit (Yes at step S8-3), and hence the frame is not discarded but transferred to the ATM encapsulating unit 3250 (step S8-5). The conventional ATM units learn the MAC address and so on at this stage, however, the ATM unit according to the present embodiment does not learn.

The ATM encapsulating unit 3250 examines whether the destination port number in the internal frame header is 0. In this example, the destination port number is 0 (Yes at step S8-6), and therefore, the ATM encapsulating unit 3250 encapsulates the frame, from which the internal frame header has been removed, into ATM cells and outputs the ATM cells to all the ATM connections referring to the PVC number control table 2261 stored in itself (step S8-8).

At this stage, 00 is allocated to the first byte of the PAD region of the RFC2684 header, as the output destination equipment port information. This value indicates that the frame is to be subjected to flooding, when the frame is subsequently received by the associated equipment in the ATM network. To the second byte of the PAD region, the receiving unit number and the receiving port number taken out of the internal frame header are allocated. These values indicate the position of the Ethernet® port that has received the MAC frame in the L2 switch 3000, and is to be learned in the Ethernet® unit in association with the source MAC address and so on, after being received by the associated equipment in the ATM network.

Figure 42:
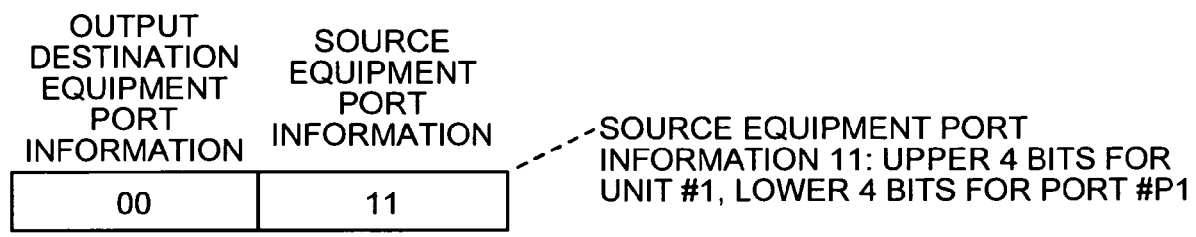
FIG. 42 is a diagram of a setting of a PAD region of the RFC2684 header.

FIG. 42 is a diagram of a setting of the PAD region of the RFC2684 header. As shown therein, 00 is allocated to the first byte of the PAD region, as the output destination equipment port information. To the upper four bits of the second byte of the PAD region, the unit number 1 of the Ethernet® unit that has received the frame is allocated, and the port number 1 of the port that has received the frame is allocated to the lower four bits.

As a result of the foregoing, the MAC frame transmitted by the terminal 21 toward the terminal 31 is transmitted to the line unit 3201 of the L2 switch 3001 and the line unit 3202 of the L2 switch 3002. Here, the frame transmitted by the line unit 2100 to the backplane is received also by the line unit 2100 and the line unit 2101, to be thereby transmitted to all the ports by flooding, except the receiving port of the frame.

Figure 38:
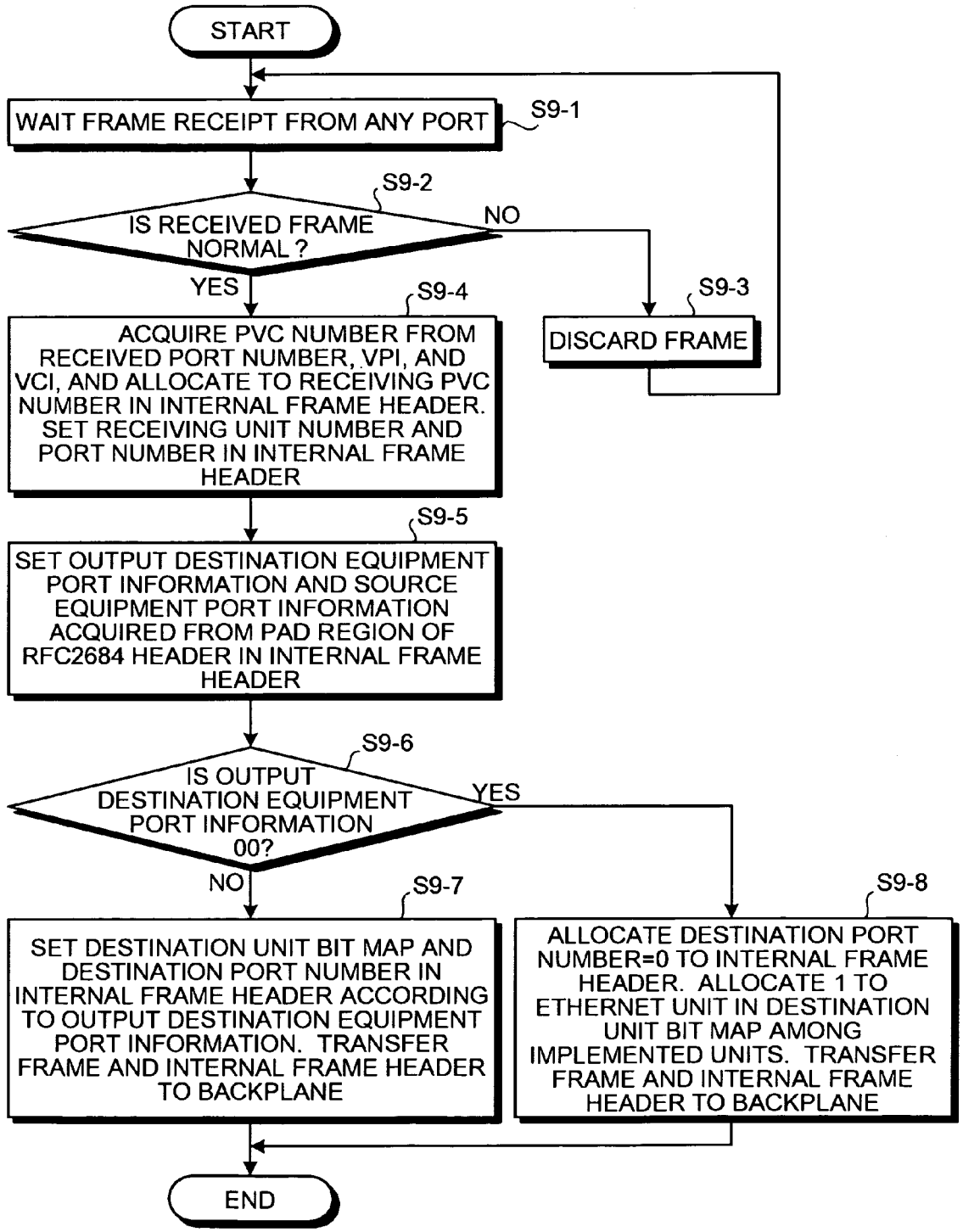
FIG. 38 is a flowchart of a process of transferring to the backplane the frame encapsulated into ATM cells received through the ATM port, performed by the unit that includes the ATM interface.

After the line unit 3201 of the L2 switch 3001 receives the frame encapsulated into ATM cells, the following process is performed. FIG. 38 is a flowchart of a process of transferring to the backplane the frame encapsulated into ATM cells received through the ATM port, performed by the unit that includes the ATM interface.

The ATM decapsulating unit 3210 of the line unit 3201 monitors the receipt of the ATM cells from the respective ATM ports, and decapsulates the received ATM cells thus to reassemble the frame (step S9-1). In this example, the ATM cells are received through the port #P1 of the line unit having the unit number of #1.

The ATM decapsulating unit 3210 then examines whether the decapsulated frame is normal. When the frame is decided to be abnormal based on the specification of the Ethernet®

(No at step S9-2), the ATM decapsulating unit 3210 discards the frame and resumes monitoring the receipt of subsequent ATM cells (step S9-3).

When the frame is decided to be normal (Yes at step S9-2), the ATM decapsulating unit 3210 adds the internal frame header to the frame, and sets the numbers of the unit and the port that have received the ATM cells as the receiving unit number and the receiving port number in the internal frame header. The ATM decapsulating unit 3210 also looks up the PVC number control table 3212 stored therein, utilizing the number of the port that has received the ATM cells and the VPI and VCI of the ATM connection as the reference key, to thereby acquire the PVC number, and allocates the PVC number to the receiving PVC number in the internal frame header (step S9-4).

Further, the ATM decapsulating unit 3210 acquires the output destination equipment port information from the first byte of the PAD region of the RFC2684 header, and the source equipment port information from the second byte, and allocates these numbers to the internal frame header, after which the ATM decapsulating unit 3210 transfers the frame to the input frame transfer unit 3220 (step S9-5).

The input frame transfer unit 3220 examines the output destination equipment port information in the internal frame header. In this example, the value of the output destination equipment port information is 00 (Yes at step S9-6), and therefore, the input frame transfer unit 3220 allocates 0 to the destination port-number and the destination PVC number in the internal frame header so as to indicate that the frame is to be subjected to flooding, and also allocates 1 to all the Ethernet® units in the destination unit bit map, thus to transfer the frame to the transmitting side backplane interface 3230 (step S9-8).

Figure 43:
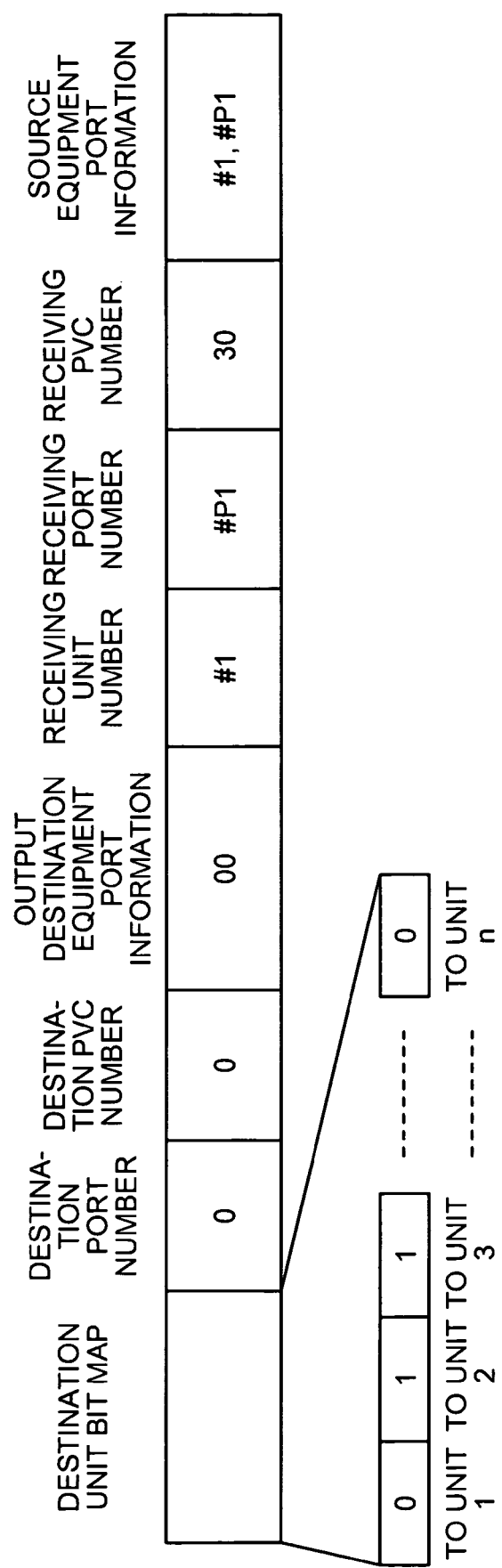
FIG. 43 is another diagram of an internal frame header of a frame to be transferred to the backplane.

FIG. 43 is a diagram of the internal frame header of the frame to be transferred to the backplane, after the foregoing process. As shown therein, 1 is allocated to the bit corresponding to the line unit 2102 and the line unit 2103 in the destination unit bit map, and 0 is allocated to the bit corresponding to the line unit 3201, which is the ATM unit. Then, 0 is allocated to the destination port number and the destination PVC number. Also, 00 is allocated to the output destination equipment port information, 30 to the receiving PVC number, and 11 to the source equipment port information.

As a result of the foregoing, the MAC frame to which the internal frame header has been added is transmitted to the line unit 2102 and the line unit 2103. Hereunder, a process after the respective line units receive the MAC frame from the backplane will be described, based on the line unit 2102 as an example.

Figure 39:
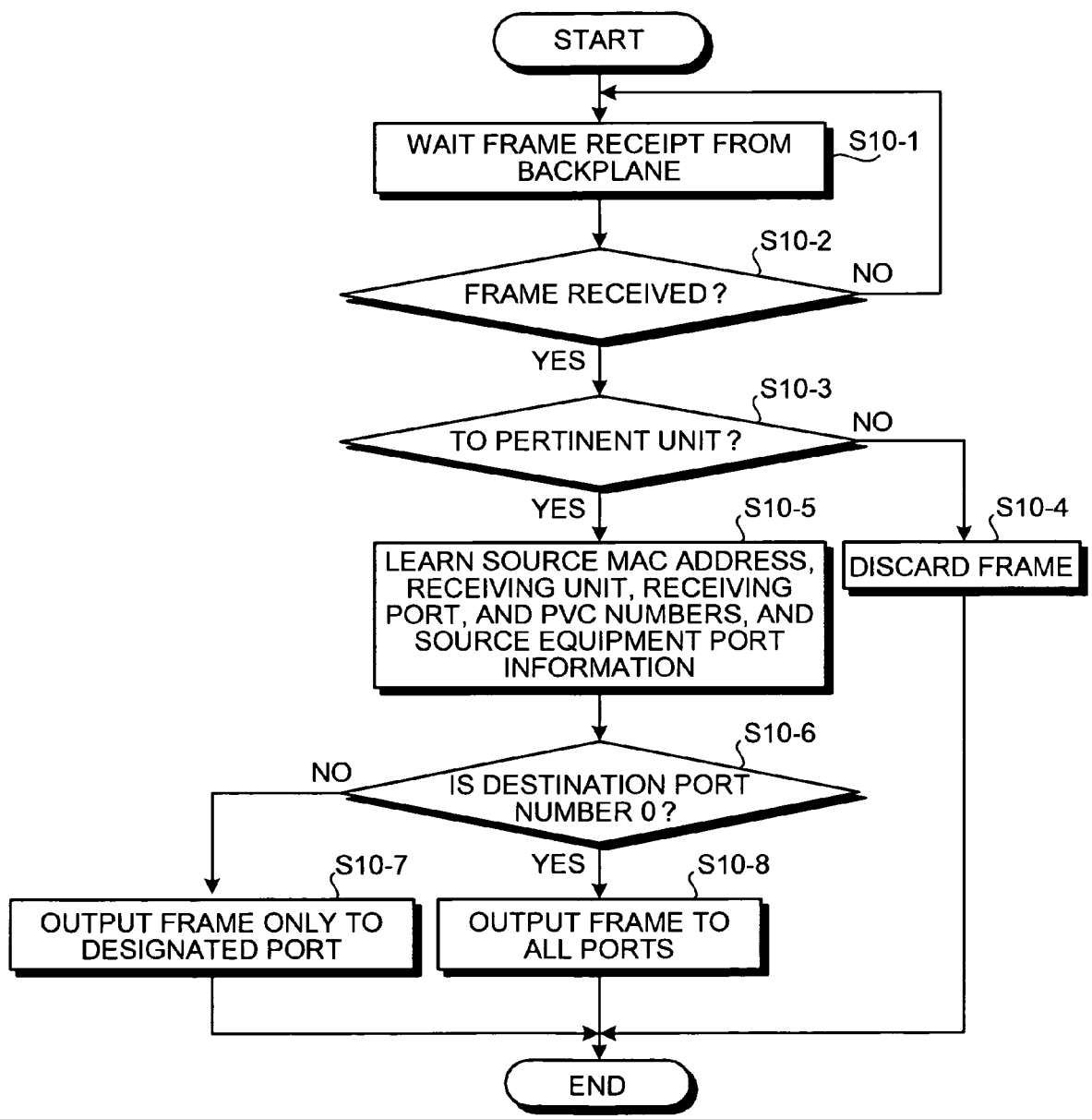
FIG. 39 is a flowchart of a process of transferring a frame received from the backplane to the Ethernet® port, performed by the unit that includes the Ethernet® interface.

FIG. 39 is a flowchart of a process of transferring a frame received from the backplane to the Ethernet® port, performed by the unit that includes the Ethernet® interface.

Out of the process from the receipt of the MAC frame from the backplane by the line unit 2102 to the transmission of the frame to the Ethernet® port, the steps up to S10-4 shown in FIG. 39 are the same as the steps already described, and hence the description thereof will be omitted.

In this example, the destination of the frame is the pertinent unit (Yes at step S10-3), and hence the frame is not discarded but transferred to the output frame transfer unit 1150. The output frame transfer unit 1150 delivers the source MAC address of the frame, and the receiving unit number, the receiving port number, the receiving PVC number, and the source equipment port information in the internal frame header to the learning/retrieving unit 1160, for registration in the reference table (step S10-5).

The output frame transfer unit 1150 examines whether the destination port number in the internal frame header is 0. In this example, the destination port number is 0 (Yes at step S10-6), and therefore, the output frame transfer unit 1150 outputs the frame, from which the internal frame header has been removed, to all the Ethernet® ports (step S10-8).

As a result of the foregoing, the MAC frame transmitted by the terminal 21 toward the terminal 31 is output to all the Ethernet® ports in the line unit 2102, so that the frame output from the port #P1 reaches the terminal 31.

The frame transmitted by the line unit 3201 to the backplane is also received by the line unit 2103, and is subjected to flooding through all the Ethernet® ports. Also, the ATM cells transmitted by the line unit 3200 to the ATM network are also received by the line unit 3202 of the L2 switch 3002, and transmitted to the line unit 2104 via the backplane upon being reassembled to the MAC frame, thus to be subjected to flooding through all the Ethernet® ports.

As a result, the MAC address of the terminal 21 is learned and registered in the reference table in the respective Ethernet® units in the L2 switch 3001 and the L2 switch 3002. FIG. 44 is an example of the reference table in the line unit 2102 after the learning. As shown therein, the source MAC address 21 of the MAC frame, the unit number #1 of the receiving line unit, the port number #P1 of the receiving port in the receiving line unit, the PVC number 30 of the ATM connection that has received the ATM cells, and the position information 11 of the port that has received the MAC frame in the associated equipment in the ATM network are stored in association with one another.

Referring again to FIGS. 36 to 39, the operating process of transmitting the frame reversely, i.e. from the terminal 31 toward the terminal 21, will be described. This process is performed with the destination MAC address already learned.

The format of the MAC frame transmitted from the terminal 31 is as shown in FIG. 4, i.e. 21 is allocated to the destination MAC address and 31 to the source MAC address.

Out of the process from the receipt of the MAC frame by the line unit 2102 through the port #P1 to the transmission of the frame to the backplane, the steps up to S7-6 shown in FIG. 36 are the same as the steps already described, and hence the description thereof will be omitted.

Upon looking up the reference table at the step S7-6, the input frame transfer unit 1120 decides that the MAC address is already learned (Yes at step S7-7), because the destination MAC address 21 is registered in the reference table as shown in FIG. 44. The input frame transfer unit 1120 then takes out the unit number, the port number, the PVC number, and the source equipment port information, all of which have been learned (step S7-8), and sets those numbers in the destination unit bit map, the destination unit number, the destination port number, the destination PVC number, and the output destination equipment port information in the internal frame header, and then transfers the frame to the transmitting side backplane interface 1130 (step S7-9).

Figure 45:
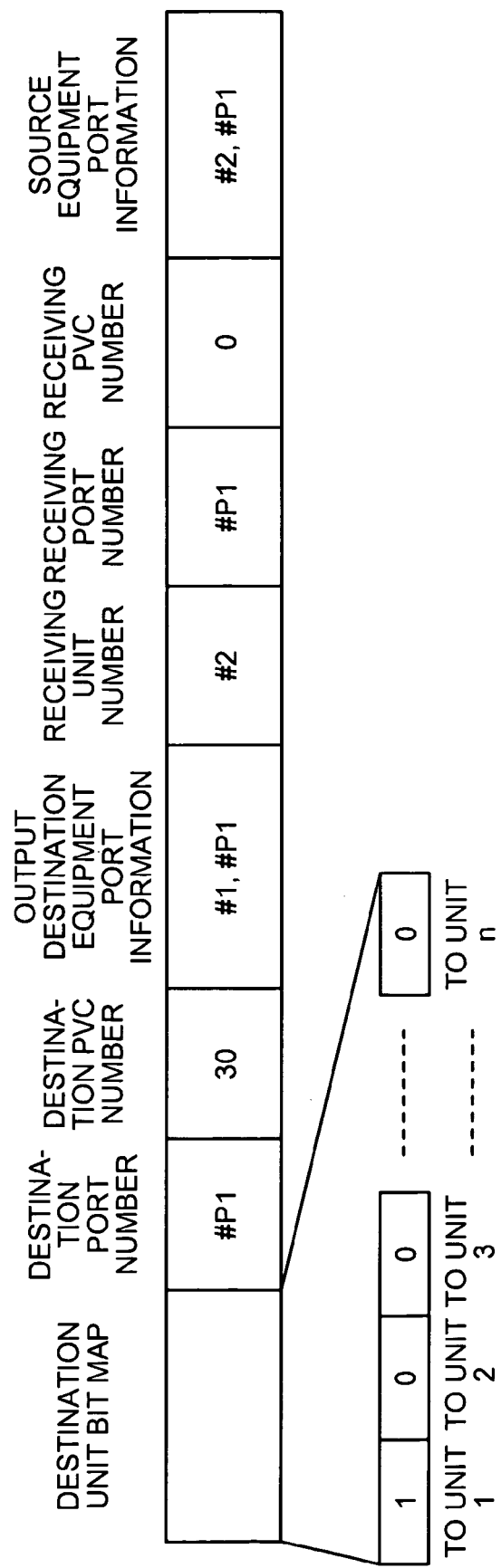
FIG. 45 is still another diagram of an internal frame header of a frame to be transferred to the backplane.

FIG. 45 is a diagram of the internal frame header of the frame to be transferred to the backplane, after the foregoing process. As shown therein, 1 is allocated only to the bit corresponding to the line unit 3201 in the destination unit bit map, 1 to the destination port number, 30 to the destination PVC number, and 11 to the output destination equipment port information. Then 2 is allocated to the receiving unit number, 1 to the receiving port number, 0 to the receiving PVC number, and 21 to the source equipment port information.

The frame to which the internal frame header has been added is transmitted to all the line units via the backplane bus, however, the frame is discarded in the line units other than the line unit 3201, because 1 is only allocated to the bit corresponding to the line unit 3201 in the destination unit bit map.

The following passages cover the process through which the line unit 3201 receives the frame from the backplane and outputs the ATM cells through the ATM port after encapsulating the frame. Out of this process, the steps up to S8-5 in FIG. 37 are the same as the steps already described, and hence the description thereof will be omitted.

The ATM encapsulating unit 3250 examines whether 0 is allocated to the destination port number in the internal frame header of the frame transferred from the receiving side backplane interface 3240. In this example, the destination port number is 1 (No at step S8-6), and therefore, the ATM encapsulating unit 3250 encapsulates the frame, from which the internal frame header has been removed, into ATM cells and looks up the PVC number control table 3251 stored therein, utilizing the destination port number and the destination PVC number in the internal frame header as the reference key to thereby acquire the VPI and VCI values, and then outputs the ATM cells to the ATM connection identified with the destination port number and the VPI and VCI values.

At this stage, the value of the output destination equipment port information in the internal frame header is allocated to the first byte of the PAD region of the RFC2684 header. To the second byte of the PAD region, the receiving unit number and the receiving port number taken out of the internal frame header are allocated.

Figure 46:
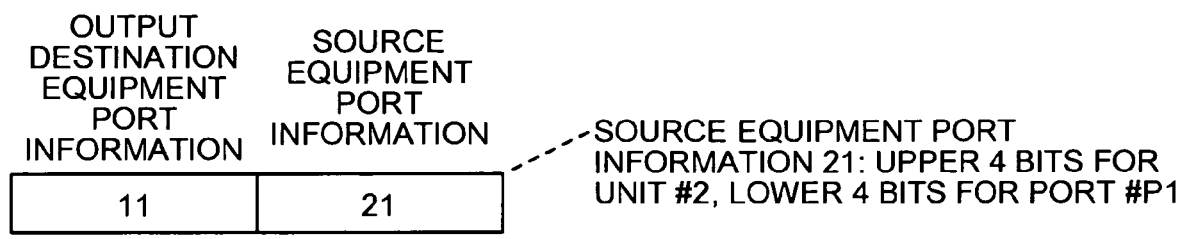
FIG. 46 is another diagram of a setting of a PAD region of the RFC2684 header.

FIG. 46 is another diagram of a setting of the PAD region of the RFC2684 header. As shown therein, 11 is allocated to the first byte of the PAD region, as the output destination equipment port information. This means that the port through which the associated equipment is to output the frame is the port #P1 of the line unit having the unit number of #1. To the upper four bits of the second byte of the PAD region, the unit number 2 of the Ethernet® unit that has received the frame is allocated, and the port number 1 of the port that has received the frame is allocated to the lower four bits.

As a result, the MAC frame transmitted by the terminal 31 toward the terminal 21 is transmitted to the PVC having the VPI=3 and VCI=300 through the port #P1 of the line unit 3201 of the L2 switch 3001, and received by the PVC having the VPI=1 and VCI=200 through the port #P1 of the line unit 3200 of the L2 switch 3000, via the ATM network.

Out of the process from the receipt of the ATM cells by the line unit 3200 through the port #P1, to the reassembly to the MAC frame and the transmission of the MAC frame to the backplane, the steps up to S9-5 shown in FIG. 38 are the same as the steps already described, and hence the description thereof will be omitted.

The input frame transfer unit 3220 examines the output destination equipment port information in the internal frame header of the frame transferred from the ATM decapsulating unit 3210. In this example, the value of the output destination equipment port information is 11 (No at step S9-6), based on which the input frame transfer unit 3220 sets the destination unit number and the destination port number in the internal frame header, and transfers the frame to the transmitting side backplane interface 3230 (step S9-7).

The input frame transfer unit 3220 allocates the value 1 of the upper four bits of the output destination equipment port information to the destination unit number in the internal frame header, and the value 1 of the lower four bits to the destination port number.

Figure 47:
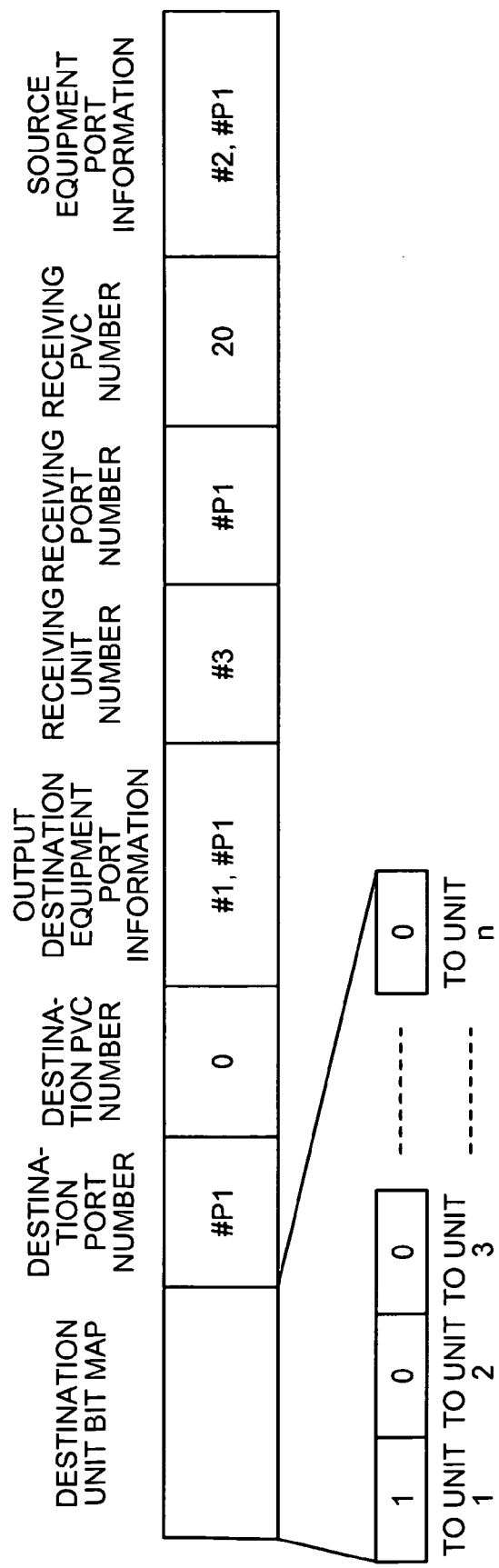
FIG. 47 is still another diagram of an internal frame header of a frame to be transferred to the backplane.

FIG. 47 is a diagram of the internal frame header of the frame to be transferred to the backplane after the foregoing process. As shown therein, 1 is allocated only to the bit corresponding to the line unit 2100 in the destination unit bit map. Then 1 is allocated to the destination port number, 0 to the destination PVC number, and 11 to the output destination equipment port information. Also, 3 is allocated to the receiving unit number, 1 to the receiving port number, 20 to the receiving PVC number, and 21 to the source equipment port information.

The following passages cover the process through which the line unit 2100 receives the frame from the backplane and outputs the frame through the Ethernet® port. Out of this process, the steps up to S10-4 in FIG. 39 are the same as the steps already described, and hence the description thereof will be omitted.

In this example, the destination of the frame is the pertinent unit (Yes at step S10-3), and hence the frame is not discarded but transferred to the output frame transfer unit 1150. The output frame transfer unit 1150 delivers the source MAC address of the frame, the receiving unit number, the receiving port number, the receiving PVC number, and the source equipment port information in the internal frame header to the learning/retrieving unit 1160, for registration in the reference table (step S10-5).

The output frame transfer unit 1150 then examines whether the destination port number in the internal frame header is 0. In this example, the destination port number is 1 (No at step S10-6), and therefore, the output frame transfer unit 1150 outputs the frame, from which the internal frame header has been removed, to the Ethernet® port (port #P1 in this example) designated by the destination port number (step S10-7).

As a result of the foregoing, the MAC frame transmitted by the terminal 31 toward the terminal 21 is output to the port #P1 of the line unit 2100, so that the terminal 21 can receive the frame. Also, the MAC address of the terminal 31 is learned and registered in the reference table in the respective line units.

According to the present embodiment, the ATM unit embeds, when encapsulating a frame into ATM cells and transmitting the ATM cells to the ATM network, the position information of the Ethernet® port that has received the frame in a part of the RFC2684 header, thereby notifying the relationship between the MAC address and the port in the pertinent unit to the associated equipment in the ATM network, and transfers, when the frame including the position information of the Ethernet® port is received from the associated equipment as the output destination, the frame to a port designated by the position information. Such a configuration allows minimizing the need for performing a flooding and thus efficiently executing the frame transfer, without granting the learning function to the ATM unit.

Also, the present embodiment allows transmitting the frame without looking up the reference table, which provides an additional advantage of reducing a delay in the frame transfer.

While the ATM is employed for connecting the LANs in the foregoing embodiment, the frame transfer method according to the embodiment is effectively applicable also to networks connected via different systems such as the Synchronous Optical Network (SONET). Whichever connection system may be employed, the frame transfer method according to the embodiment is applicable as long as the system allows embedding the port position information in a part of the frame.

Also, even when the broadcast domain is restricted by a VLAN system, the frame transfer method according to the embodiment is equally applicable to an L2 switch provided with the VLAN function, because the frame transfer method operates based on the port number regardless of the VLAN-ID.

Meanwhile, the L2 switch according to the embodiment operates on the premise that the associated equipment in the ATM network designates the output destination port. When the ATM network includes the conventional L2 switch(es), however, the associated equipment in the ATM network may fail to provide the information on the output destination port, which leads to an increase in the frequency of performing the flooding.

When the L2 switch according to the embodiment is employed under such circumstances, the ATM unit of the L2 switch according to the embodiment may be provided with the learning function. This may lead to an increase in cost of the equipment, however, designing the method so as to utilize the output destination port information with priority when the associated equipment in the ATM network provides such information reduces the frequency of looking up the reference table, thus minimizing the delay in the frame transfer.

According to the present invention, the transmitting apparatus embeds, when transmitting a frame to the network-to-network communications interface, the position information of the port that has received the frame in a part of the frame, thereby notifying the relationship between the MAC address and the port in the transmitting apparatus to the associated equipment, and transfers, when the frame including the port position information is received from the associated equipment of the network-to-network communications, the frame to a port designated by the position information. Such configuration allows minimizing the need of performing a flooding and thus efficiently executing the frame transfer, without granting the learning function to the transmitting apparatus.

Also, the transmitting apparatus according to the present invention performs a flooding when the port position information is not included in the frame received from the associated equipment of the network-to-network communications. Such configuration enables delivering the frame to the destination equipment, even though the frame received from the associated equipment of the network-to-network communications does not include the port position information.

Furthermore, the transmitting apparatus according to the present invention stores the port position information included in the frame when learning the source address of the frame received from the associated equipment of the network-to-network communications, so as to embed the port position information in the frame when transmitting the frame, when the output destination of the frame is decided based on the learned information. Such configuration allows deciding the output destination of the frame without the need to look up a reference table in the associated equipment of the network-to-network communications.

Moreover, the transmitting apparatus according to the present invention also learns by itself the relationship between the source address of the frame and the position information of the receiving port with respect to the frame to be output to the network-to-network communications interface, so as to decide the path according to such learned information when the frame received from the associated equipment of the network-to-network communications interface does not include the port position information designating the output destination. Such configuration allows minimizing the need of performing flooding and thus efficiently executing the frame transfer, even when the associated equipment of the network-to-network communications includes transmitting apparatus that does not embed the position information of the receiving port in the frame to be output to the network-to-network communications interface.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmitting apparatus comprising:
   a first network interface unit that is connected to a local area network; and
   a second network interface unit that is connected to an ATM network, wherein
   the first network interface unit includes
      a learned-information storing unit that stores a destination address of a frame and port information associated with each other, the port information identifying a destination port for a remote local area network in a destination transmitting apparatus which is connected through the ATM network to the transmitting apparatus,
      a first external-receiving unit that receives a frame from the local area network,
      a first internal-frame generating unit that generates an internal frame by adding an internal header to the frame received by the first external-receiving unit, identifying port information by searching the learned-information storing unit by a destination address of the frame, and adding identified port information as port information of a destination transmitting apparatus, which is connected through the ATM network to the transmitting apparatus, to the internal header if the port information is identified,
      a first internal-transferring unit that transfers the internal frame generated by the first internal-frame generating unit to the second network interface unit,
      a first internal-receiving unit that receives an internal frame transferred by the second network interface unit, and
      a first external-transferring unit that generates a frame by removing an internal header from the internal frame received by the first internal-receiving unit and transfers the frame based on port information of a destination transmitting apparatus, the port information of the destination transmitting apparatus being extracted from an ATM-network frame received from the ATM network and being included in the internal header, and
   the second network interface unit includes
      a second internal-receiving unit that receives the internal frame transferred by the first internal-transferring unit,
      a second-network-frame generating unit that generates an ATM-network frame by removing an internal header from the internal frame received by the second internal-receiving unit, adding an ATM-network header, and adding port information of the destination transmitting apparatus to the ATM-network header, the port information of the destination transmitting apparatus being included in the internal header,
      a second external-transferring unit that transfers the ATM-network frame generated by the second-network-frame generating unit to the ATM network,
      a second external-receiving unit that receives an ATM-network frame from the ATM network, a second internal-frame generating unit that generates an internal frame by removing an ATM-network header from the ATM-network frame received by the second external-receiving unit, adding an internal header, and adding port information of a destination transmitting apparatus to the internal header, the port information being included in the removed ATM-network header, and a second internal-transferring unit that transfers the internal frame generated by the second internal-frame generating unit to the first network interface unit.

2. The transmitting apparatus according to the claim 1, wherein
the first external-transferring unit transfers the frame to all the ports if the port information is not embedded in the internal frame.

3. A frame transmitting method between a first transmitting apparatus which includes a first network interface unit connected to a local area network and a second network interface unit connected to an ATM network and a second transmitting apparatus which includes a third network interface unit connected to the ATM network and a forth network interface unit connected to a remote local area network, the frame transmitting method comprising:

first receiving, by the first network interface unit of the first transmitting apparatus, a frame from the local area network, first generating, by the first network interface unit of the first transmitting apparatus, an internal frame by adding an internal header to the frame received at the first receiving, identifying port information by searching a learned-information storing unit by a destination address of the frame, and adding identified port information as port information for the remote local area network in the second transmitting apparatus to the internal header if the port information is identified, the learned-information storing unit storing the destination address of the frame and the port information for the remote local area network in the second transmitting apparatus associated with each other, first transferring, by the first network interface unit of the first transmitting apparatus, the internal frame generated at the first generating to the second network interface unit of the first transmitting apparatus, second receiving, by the second network interface unit of the first transmitting apparatus, the internal frame transferred at the first transferring, second generating, by the second network interface unit of the first transmitting apparatus, an ATM-network frame by removing an internal header from the internal frame received at the second receiving, adding a ATM-network header, and adding the port information for the remote local area network in the second transmitting apparatus to the ATM-network header, the port information for the remote local area network in the second transmitting apparatus being included in the internal header, second transferring, by the second network interface unit of the first transmitting apparatus, the ATM-network frame generated at the second generating to the ATM network, third receiving, by the third network interface unit of the second transmitting apparatus, the ATM-network frame from the ATM network, third generating, by the third network interface unit of the second transmitting apparatus, an internal frame by removing the ATM-network header from the ATM-network frame received at the third receiving, adding the internal header, and adding the port information for the remote local area network in the second transmitting apparatus to the internal header, the port information for the remote local area network in the second transmitting apparatus being included in the removed ATM-network header, third transferring, by the third network interface unit of the second transmitting apparatus, the internal frame generated at the third generating to the forth network interface unit of the second transmitting apparatus, forth receiving, by the forth network interface unit of the second transmitting apparatus, the internal frame transferred at the third transferring, forth generating, by the forth network interface unit of the second transmitting apparatus, a frame by removing the internal header from the internal frame received at the forth receiving, and forth transferring, by the forth network interface unit of the second transmitting apparatus, the frame to the remote local area network based on the port information for the remote local area network in the second transmitting apparatus, the port information for the remote local area network in the second transmitting apparatus being extracted from the ATM-network frame received from the ATM network and being included in the internal header.

4. The frame transmitting method according to claim 3, wherein
the forth transferring, by the forth network interface unit of the second transmitting apparatus, transfers the frame to all the ports if the port information is not embedded in the internal frame.

* * * * *